United States Patent
Inoue et al.

(10) Patent No.: US 9,075,767 B2
(45) Date of Patent: Jul. 7, 2015

(54) PARALLEL COMPUTER SYSTEM, SYNCHRONIZATION APPARATUS, AND CONTROL METHOD FOR THE PARALLEL COMPUTER SYSTEM

(75) Inventors: Tomohiro Inoue, Kawasaki (JP); Yuichiro Ajima, Kawasaki (JP); Shinya Hiramoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 716 days.

(21) Appl. No.: 13/323,936

(22) Filed: Dec. 13, 2011

(65) Prior Publication Data

US 2012/0159121 A1    Jun. 21, 2012

(30) Foreign Application Priority Data

Dec. 17, 2010 (JP) ................................ 2010-282190

(51) Int. Cl.
*G06F 15/16* (2006.01)
*G06F 15/173* (2006.01)

(52) U.S. Cl.
CPC ................................ *G06F 15/17325* (2013.01)

(58) Field of Classification Search
CPC ................................................ G06F 15/17325
USPC ........................................................ 713/375
See application file for complete search history.

(56) References Cited

U.S. PATENT DOCUMENTS

| | | | |
|---|---|---|---|
| 5,928,351 A * | 7/1999 | Horie et al. ...................... | 712/11 |
| 5,978,830 A * | 11/1999 | Nakaya et al. ................ | 718/102 |
| 7,408,959 B2 | 8/2008 | Braff et al. | |
| 8,572,615 B2 * | 10/2013 | Inoue et al. .................... | 718/100 |
| 2008/0077921 A1 * | 3/2008 | Chaudhary et al. ........... | 718/100 |
| 2010/0124241 A1 | 5/2010 | Hiramoto et al. | |

FOREIGN PATENT DOCUMENTS

| | | |
|---|---|---|
| EP | 2189903 A2 | 5/2010 |
| JP | 2001-051966 A | 2/2001 |
| JP | 2010-122848 A | 6/2010 |

OTHER PUBLICATIONS

Extended European Search Report dated Apr. 11, 2012 for corresponding European Application No. 11193836.1.

(Continued)

*Primary Examiner* — Mark Connolly
(74) *Attorney, Agent, or Firm* — Staas & Halsey LLP

(57) ABSTRACT

A synchronization apparatus includes a receiver that receives data from a synchronization apparatus of another node that performs synchronization with its own node from among the plurality of synchronization apparatuses and extracts synchronization information from the received data, a transmitter that transmits the data to the synchronization apparatus of the other node, a receiving state register that stores the extracted synchronization information, a delay unit that delays the received data by a specified period of time, and a controller that stores the extracted synchronization information and synchronization information from its own controller in the reception state register and causes the transmitter to transmit the data to the other node and returns the data to its own node back to its own controller via the delay unit when the extracted synchronization information and the synchronization information from its own controller are stored in the reception state register.

12 Claims, 19 Drawing Sheets

(56) References Cited

OTHER PUBLICATIONS

Brooks III, Eugene D., "The Butterfly Barrier," International Journal of Parallel Programming, vol. 15, No. 4, Dec. 1, 1986, pp. 295-307, URL:http://www.springerlink.com.content/tu5n5165r7883243/.

Hoefler, Torsten et al., "A Survey of Barrier Algorithms for Coarse Grained Supercomputers," Internet Citation, Jan. 1, 2004, pp. 1-20, URL:http://citeseerx.ist.psu.edu/viewdoc/summary?doi=10.1.1.83.5369.

Kodama, Yuetsu et al., "The EM-X Parallel Computer: Architecture and Basic Performance," Proceedings 22$^{nd}$ Annual International Symposium on Computer Architecture, Jun. 24, 1995, pp. 14-23.

* cited by examiner

FIG. 5

| BYTE | | | | |
|---|---|---|---|---|
| 0 | HEADER CRC | | ROUTING HEADER | |
| 8 | TYPE | DESTINATION NODE ADDRESS | TRANSMISSION SOURCE NODE ADDRESS | |
| 16 | TRANSMISSION SOURCE STAGE NUMBER | DESTINATION STAGE NUMBER | SEQUENCE NUMBER | |
| 20 | PACKET CRC | | | |

PARALLEL COMPUTER SYSTEM, SYNCHRONIZATION APPARATUS, AND CONTROL METHOD FOR THE PARALLEL COMPUTER SYSTEM

CROSS-REFERENCE TO RELATED APPLICATION

This application is based upon and claims priority to prior Japanese Patent Application No. 2010-282190 filed on Dec. 17, 2010 in the Japan Patent Office, the entire contents of which are incorporated herein by reference.

FIELD

The present invention relates to a parallel computer system, a synchronization apparatus, and a control method for the parallel computer system.

BACKGROUND

In a parallel computer system, as a method of setting out asynchronization between a plurality of processes that are processed in parallel between a plurality of nodes, a barrier synchronization has been proposed. A point for setting out the synchronization, in this instance, a barrier point is set in accordance with a progress phase (stage) of the processing in the process in the barrier synchronization, and in a case where the processing in the process arrives at the barrier point, the process for carrying out the barrier synchronization waits for the progress of the processing in the process in the other nodes by temporarily stopping its own processing in the process. The process for carrying out the barrier synchronization resumes the stopped processing by finishing the waiting state at a time point when all the processes that are processed in parallel for carrying out the barrier synchronization arrive at the barrier point. According to this, between the plurality of processes that are processed in parallel between the plurality of nodes, it is possible to set out the synchronization in the parallel processing.

In a barrier synchronization apparatus, when the barrier synchronization is executed, depending on an algorithm, the process needs to change a transmission destination of a signal or a message indicating the arrival at the barrier point (barrier synchronization message) for each of the stages. In view of the above, a barrier synchronization apparatus that realizes the transmission destination change processing in the barrier synchronization by using hardware has been proposed. According to this barrier synchronization apparatus, an intermediation of a CPU (central processing unit) for each of the stages is eliminated, and a higher speed of the barrier synchronization can be realized. Furthermore, in this barrier synchronization apparatus, a synchronization unit for setting out a synchronization of plural sets of signals or messages is provided. According to this, while a configuration of a network between the plurality of nodes is not limited in a case where the nodes are connected by the network, it is possible to execute the barrier synchronization at a high speed.

It should be noted that the following configuration has been proposed. An intra-node barrier synchronization mechanism detects that the barrier synchronization in its own apparatus is established on the basis of a synchronization request from the CPU provided in its own apparatus and also notifies all the node apparatuses that executes the parallel processing of the information on the establishment of the barrier synchronization in its own apparatus. An inter-node barrier synchronization mechanism detects that the parallel processing is completed on the basis of the information on the establishment of the barrier synchronization in the other apparatus which is notified from the other node apparatus that executes this parallel processing. While a complication of the barrier synchronization mechanism is not caused and also a special communication mechanism is not provided, by transmitting and receiving the information on the establishment of the barrier synchronization in its own apparatus, the completion of the parallel processing is detected.

In a parallel computer system, a global clock is used for a time synchronization between the plurality of nodes included in the entire system. To realize the global clock establishing the synchronization between the plurality of nodes, it is conceivable to use the barrier synchronization apparatus. That is, it is conceivable to realize the global clock establishing the synchronization between the respective nodes that are the barrier synchronization apparatuses by using the barrier synchronization apparatus based on a butterfly algorithm in which the high speed of the barrier synchronization is realized without the intermediation of the CPU for each of the stages. However, in the barrier synchronization based on the butterfly algorithm in which the high speed of the barrier synchronization is realized without the intermediation of the CPU for each of the stages, because of a fluctuation in an arrival timing of the synchronization messages from the respective processes, the establishment of the synchronization between the plurality of nodes fluctuates. Because of this fluctuation in the establishment of the synchronization between the plurality of nodes, a phase difference is generated between the global clocks of the respective nodes in the global clock. For this reason, in a case where the global clock is realized by using the barrier synchronization apparatus based on the butterfly algorithm in which the high speed of the barrier synchronization is realized without the intermediation of the CPU for each of the stages, it is necessary to reduce the fluctuation in the establishment of the synchronization between the plurality of nodes.

The present invention provides a parallel computer system in which the fluctuation in the establishment of the synchronization between the plurality of nodes is reduced in the barrier synchronization.

Related-art techniques related to a parallel computer system, a synchronization apparatus, and a control method for the parallel computer system are disclosed as follows.

[Patent Document 1] Japanese Laid-open Patent Publication No. 2010-122848
[Patent Document 2] Japanese Laid-open Patent Publication No. 2001-051966

SUMMARY

According to an aspect of the invention, a synchronization apparatus includes a receiver that receives data from a synchronization apparatus of another node that performs synchronization with its own node from among the plurality of synchronization apparatuses and extracts synchronization information from the received data, a transmitter that transmits the data to the synchronization apparatus of the other node, a receiving state register that stores the extracted synchronization information, a delay unit that delays the received data by a specified period of time, and a controller that stores the extracted synchronization information and synchronization information from its own controller in the reception state register and causes the transmitter to transmit the data to the other node and returns the data to its own node back to its own controller via the delay unit when the extracted synchronization information and the synchronization information from its own controller are stored in the reception state register.

BRIEF DESCRIPTION OF THE DRAWINGS

FIG. 5 illustrates a format of a packet;

DESCRIPTION OF EMBODIMENTS

First, a barrier synchronization and a reduction computation will be described in brief.

Figure 16:
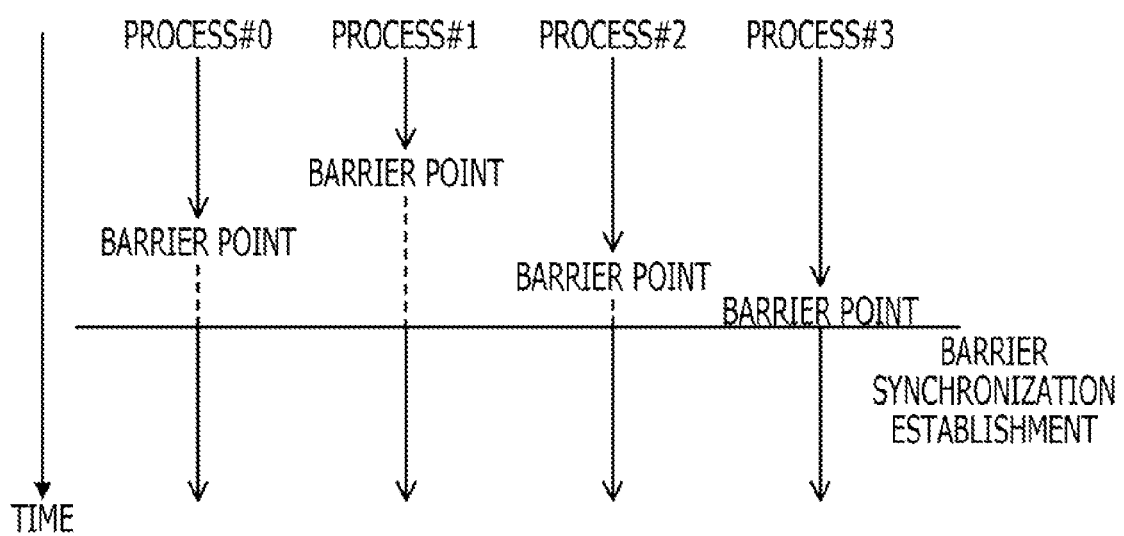
FIG. 16 illustrates an outline of the barrier synchronization.

In the barrier synchronization, as illustrated in FIG. 16, in a case where the process arrives at a point where the processing sets out the synchronization, in this instance, a barrier point, each of a plurality of processes #0 to #3 where the barrier synchronization is carried out stops its own processing. That is, in a case where the process arrives at the barrier point, each of the plurality of processes #0 to #3 waits for the other process to arrive at the barrier point. At a time when all the processes #0 to #3 where the barrier synchronization is carried out arrive at the barrier point, that is, at a time when the barrier synchronization is established, each of the plurality of processes #0 to #3 cancels the waiting state and resumes the stopped processing. According to this, it is possible to set out the synchronization in the parallel processing between the plurality of processes that are processed in parallel.

An algorithm for realizing the above-mentioned barrier synchronization includes a butterfly computation. Hereinafter, the butterfly computation is simply referred to as "butterfly". In the butterfly, the processing is divided into a plurality of stages, and a communication of a barrier synchronization message is carried out with the other process for each of the stages. In this example, as an algorithm for the barrier synchronization, the butterfly is used.

Figure 17A:
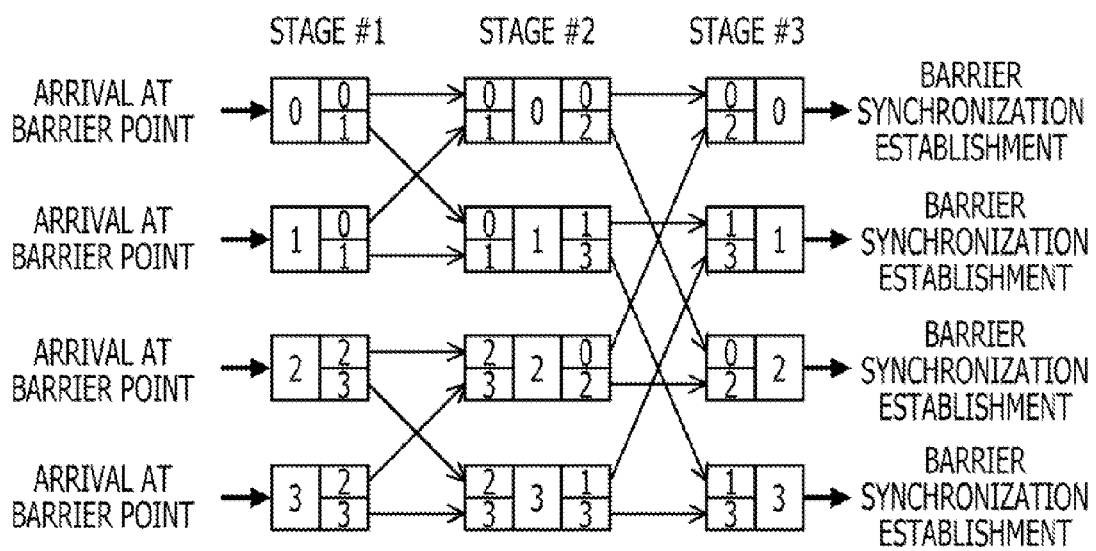
FIGS. 17A and 17B illustrate an example of the barrier synchronization based on the butterfly with four processes.
Figure 17B:
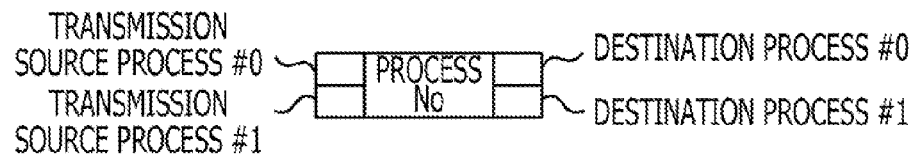

FIG. 17A illustrates an example in which the barrier synchronization based on the butterfly is carried out between the four processes #0 to #3. Each of the processes in FIG. 17A is represented as illustrated in FIG. 17B. In FIG. 17B, an upper left number represents a transmission source process, a lower left number represents the transmission source process, a central number represents its own process, an upper right number represents a transmission destination process or a destination process, and a lower right number represents the transmission destination process or the destination process. The processing is represented by a process number that is identification information for identifying the process.

A transmission destination of a barrier synchronization message representing that the process reaches the barrier point in each of the stages (hereinafter, which may be simply abbreviated as "message" in some cases) becomes i XOR $2^{(k-1)}$ when a stage number is set as k and its own process or a process number of its own node 1 is set as i. XOR represents exclusive-OR operation. The number of stages becomes log (N) when the number of processes N is a power of 2.

Figure 18A:
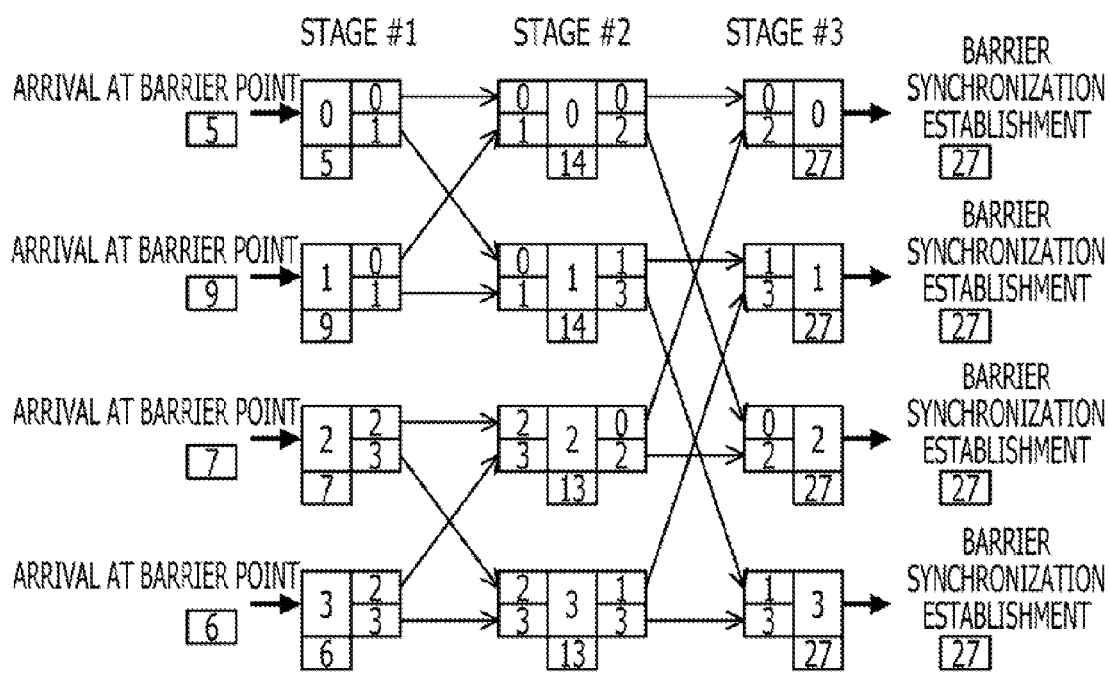
FIGS. 18A and 18B illustrate an outline of the reduction computation.

FIG. 18A illustrates an example in which the reduction computation is carried out between the four processes #0 to #3 by utilizing the barrier synchronization based on the butterfly. The reduction computation is executed while the barrier synchronization based on the butterfly illustrated in FIG. 17A is utilized. Therefore, FIG. 18A basically indicates a flow substantially similar to FIG. 17A.

Figure 18B:
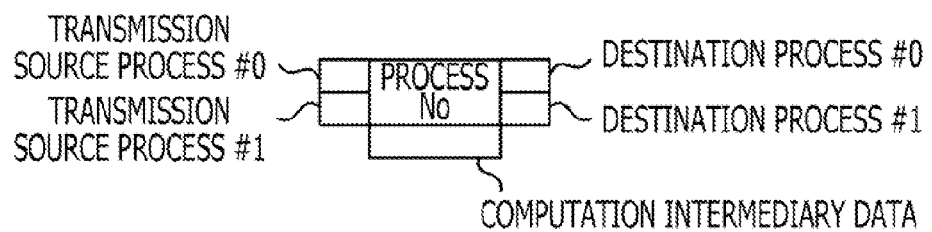

Each of the processes in FIG. 18A is represented as illustrated in FIG. 18B. In FIG. 18B, basically, reference symbols similar to those in FIG. 17B are represented, but FIG. 18B is different from FIG. 17B in that computation intermediary data of the reduction computation is further included. In FIG. 18B, the computation intermediary data is illustrated below the process number on the center which represents its own process. The data at the time of arrival at the barrier point and the data at the time of the establishment of the barrier synchronization are also represented as the computation intermediary data.

Hereinafter, mainly, the barrier synchronization based on the butterfly will be described.

For example, in FIG. 17A, when attention is paid to the processing #0, the transmission destination is previously set as follows. That is, in the stage #1, the transmission destination of the message indicating the arrival at the barrier point is the processing #1. In the stage #2, the reception source of the message indicating the arrival at the barrier point from the processing #0 is the processing #1, and the transmission destination of the message indicating the arrival at the barrier point from the processing #0 is the processing #2.

In the setting condition, the transmission destination and the reception source of these messages can be uniquely set since the algorithm of the barrier synchronization and the execution condition, in this instance, the process configurations are decided. In this example, since the algorithm of the barrier synchronization is the butterfly and the execution condition is the four processes, the setting can be made as described above.

The respective processes mutually communicate the synchronization message with the other process for each of the stages. For example, in the first stage #1, the respective processes arrival at the barrier synchronization point. The arrival times vary in the respective processes. In this case, the respective processes send the synchronization message to the process previously set in the next stage on the butterfly network.

In the next stage #2, the respective processes wait for the synchronization message from the previously set processing in the previous stage #1 on the butterfly network. In a case where the synchronization message is received from the other process, the respective processes send the synchronization message to the previously set process in the next stage #3.

In the last stage #3, the respective processes wait for the synchronization message from the previously set process in the previous stage #2. When the respective processes receive the synchronization message from the other process, all the processes #0 to #3 determine that the barrier synchronization is established after arriving at the barrier point. After this, since the barrier synchronization is established, the respective processes start the next processing.

It should be noted that in the reduction computation, instead of the synchronization message, the synchronization message and the computation intermediary data that is the computation target of the reduction computation sent and received between the respective processes are awaited. The process that has received the computation intermediary data executes the reduction computation and sets the data calculated through the reduction computation as the computation intermediary data. With the establishment of the barrier synchronization, the reduction computation is also completed.

Figure 19:
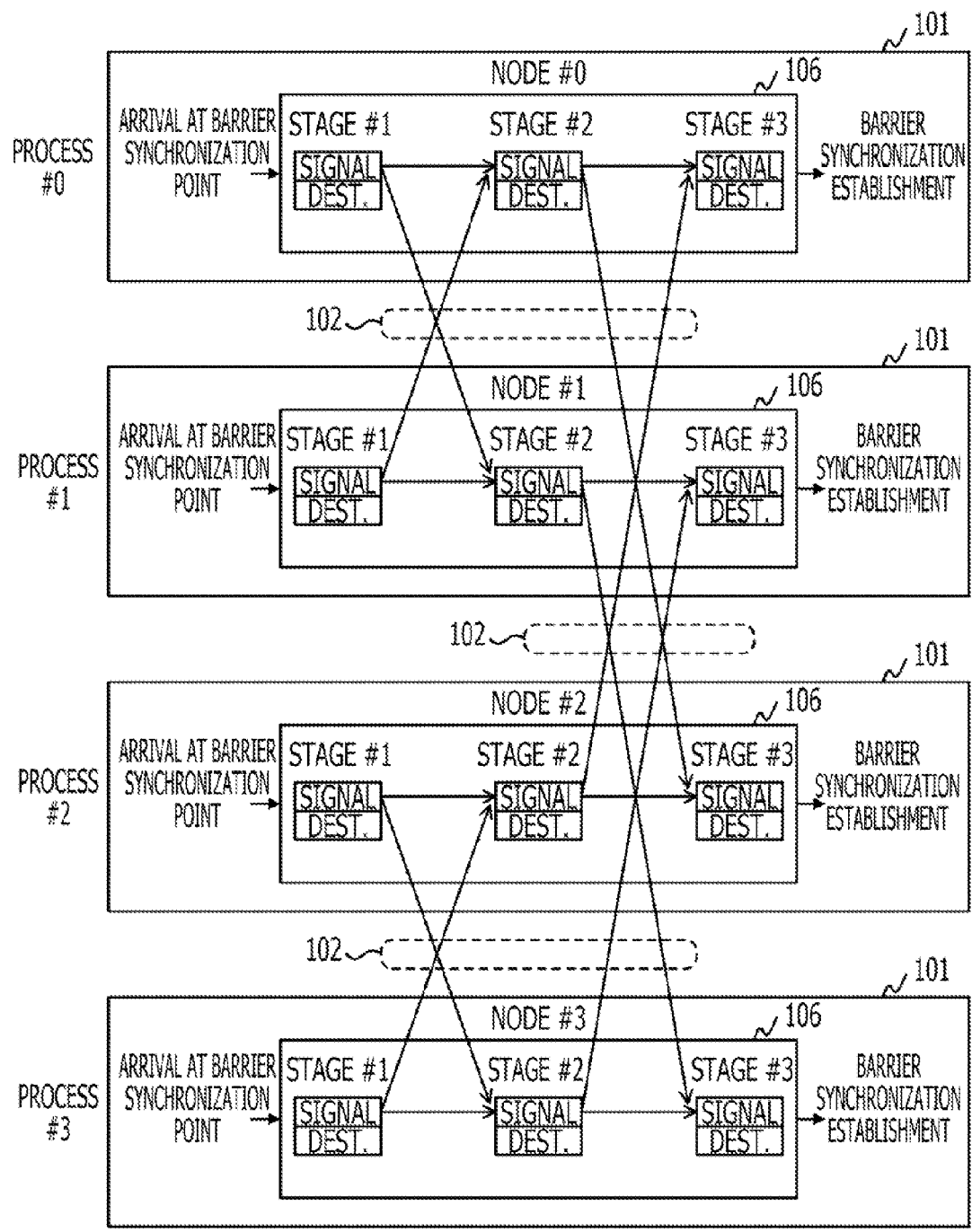
FIG. 19 illustrates an example diagram for reviewing a delay time for an establishment of the synchronization.

Herein, as illustrated in FIG. 19, it is expected that each of the four processes #0 to #3 is operated on four different nodes 101, respectively. In this case, for example, when attention is paid to the processing #0 operated on a node #0, the stage #2 of the processing #0 receives the synchronization message from the stage #1 of its own node #0 and the synchronization message from the stage #1 of the other node #0.

Since the synchronization message from the stage #1 of its own node #0 is sent and received in a barrier synchronization apparatus 106 of the node #0, for example, the synchronization message arrives at the stage #2 of the processing #0 in a shorter period of time as compared with a case where the synchronization message is sent and received between different nodes. On the other hand, since the synchronization message from the stage #1 of the other node #0 is sent and received between its own node #0 and the other node #1 via a network 102, the synchronization message arrives at the stage #2 of the processing #0 later than the synchronization message from the stage #1 of its own node #0. With regard to the other stage of the other node 101, the synchronization message via the network 102 is delayed with respect to the synchronization message sent and received in the barrier synchronization apparatus 106. Therefore, between the respective stages of the plurality of nodes #0 to #3, since the arrival time of the synchronization message from the respective processes fluctuates, the establishment of the synchronization fluctuates between the respective nodes, and this fluctuation becomes a cause for generating the phase difference in the global clock.

According to the parallel computer system, the synchronization apparatus, and the control method for the parallel computer system disclosed herein, in the barrier synchronization, the fluctuation in the establishment of the synchronization between the plurality of nodes is almost eliminated.

Figure 1:
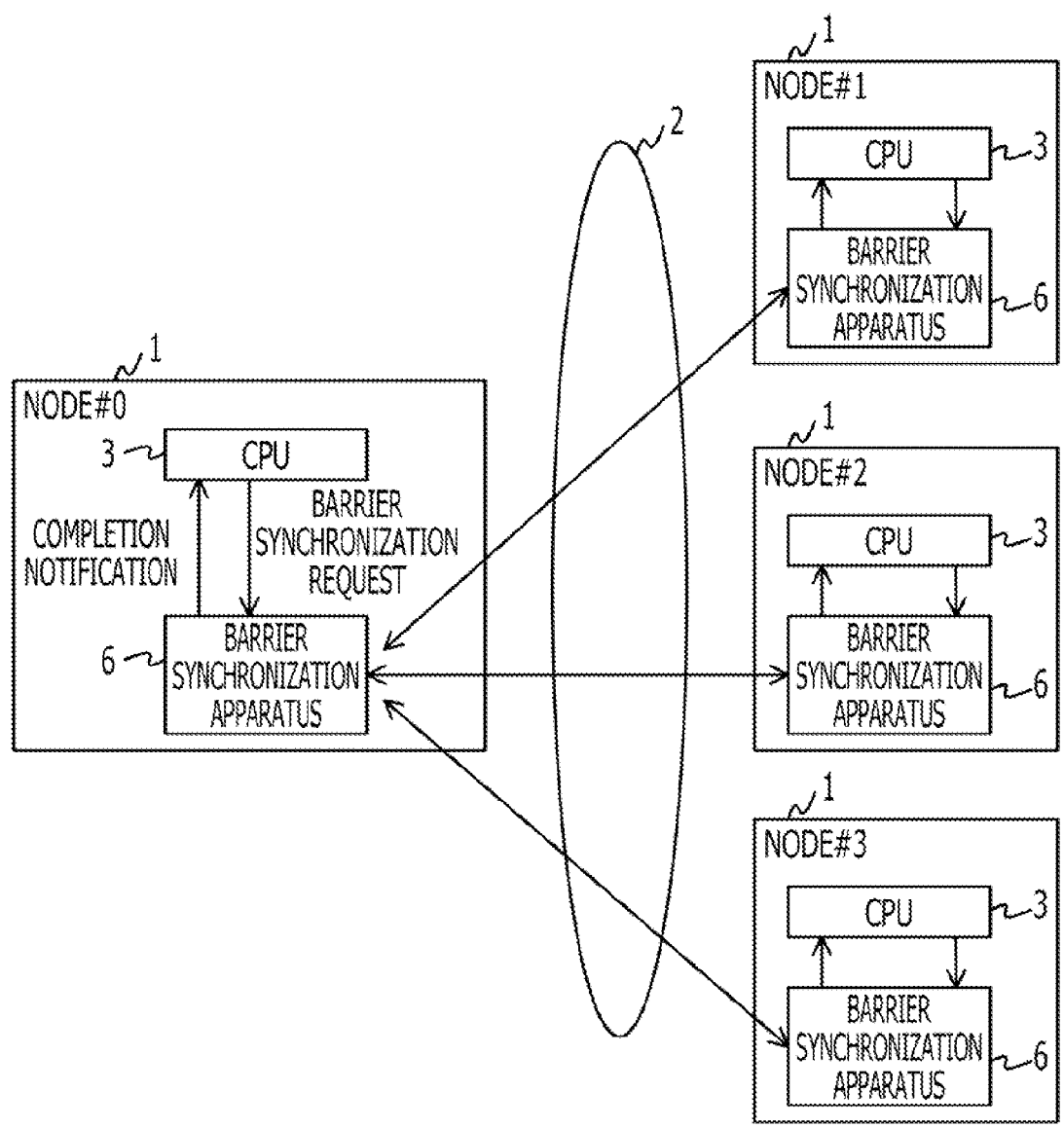
FIG. 1 illustrates an example of a configuration of a parallel computer system.

FIG. 1 illustrates an example of a configuration of a computer network having a plurality of nodes including a barrier synchronization apparatus, in other words, a parallel computer system.

The parallel computer system includes a plurality of nodes 1, in this instance, computers 1 and a network 2 for connecting these nodes. In the example of FIG. 1, four nodes including a node #0 to a node #3 are provided in the parallel computer system. The plurality of nodes 1 are mutually connected, for example, via the network 2 which is a mutual coupling network. The plurality of nodes 1 connected by the network 2 executes a parallel computation. Each of the plurality of nodes 1 includes a barrier synchronization apparatus 6 for a barrier synchronization in the parallel computation. In other words, the parallel computer system includes the plurality of barrier synchronization apparatus 6. The barrier synchronization apparatus 6 performs the barrier synchronization at a high speed.

With regard to the parallel computer system of FIG. 1, as an example in which the plurality of nodes 1 are mutually connected, a state is illustrated in which the node #0 is connected to each of the node #1 to the node #3. Also, in FIG. 1, it is schematically represented that each of the nodes 1 includes a CPU 3 and the barrier synchronization apparatus 6.

Figure 2:
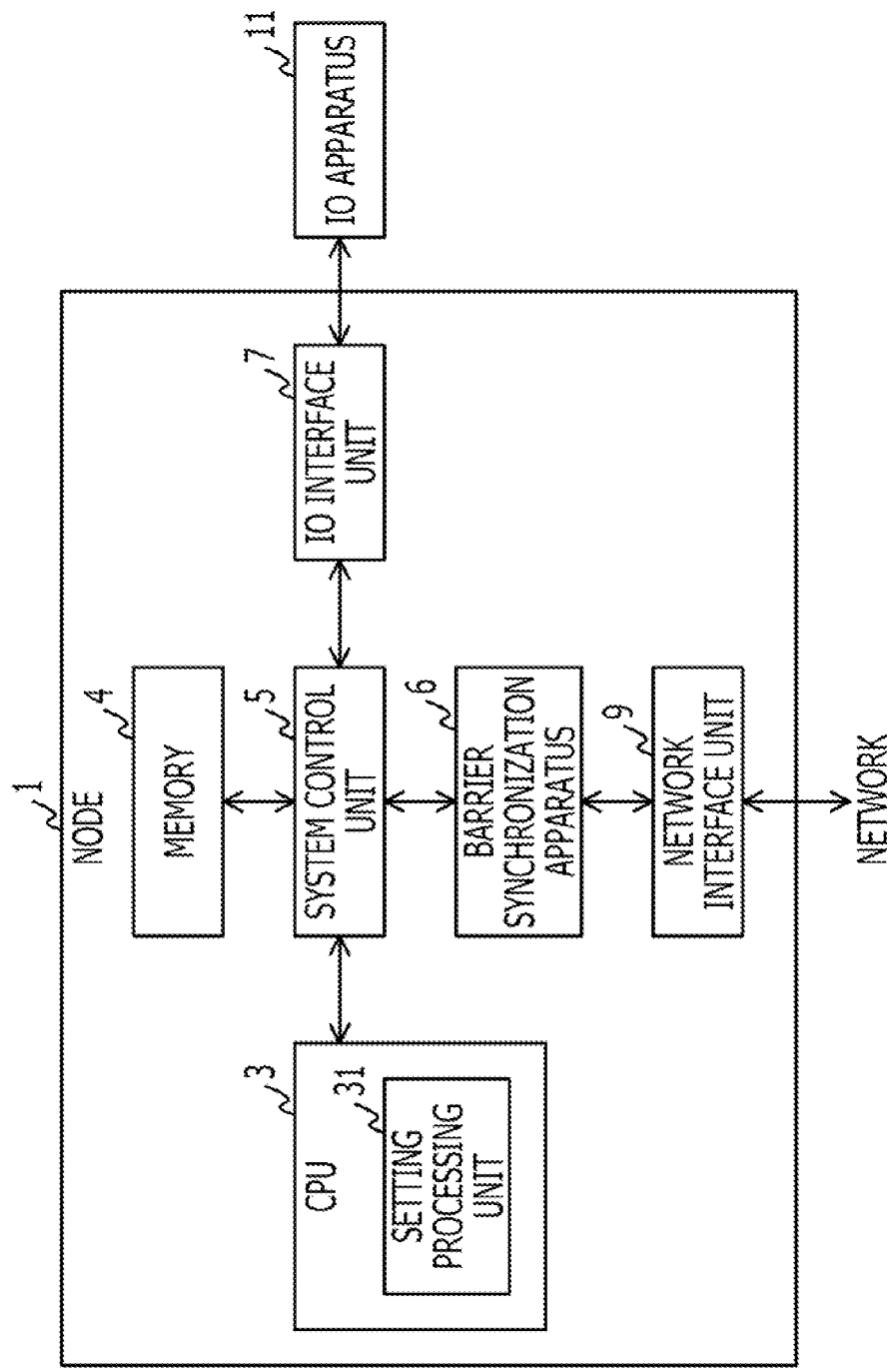
FIG. 2 illustrates an example of a configuration of a node including a barrier synchronization apparatus.

FIG. 2 illustrates an example of a configuration of a node including a barrier synchronization apparatus that performs the barrier synchronization by using the butterfly.

The node 1 includes the CPU 3, a memory 4, a system control unit 5, the barrier synchronization apparatus 6, an IO (Input Output) interface unit 7, and a network interface unit 9. The system control unit 5 controls the node 1. That is, the system control unit 5 controls the CPU 3, the memory 4, the barrier synchronization apparatus 6, and an IO (Input Output) apparatus 11. The CPU 3 includes a setting processing unit 31. The system control unit 5 is connected to the IO apparatus 11 via the IO interface unit 7. The IO interface unit 7 may be provided to the system control unit 5. The barrier synchronization apparatus 6 is connected to the network 2 via the network interface unit 9. The network interface unit 9 may be provided to the barrier synchronization apparatus 6.

The setting processing unit 31 performs a transmission and a reception of data with the IO apparatus 11 via the system control unit 5 and the interface unit 7. According to this, the IO apparatus 11 inputs the setting condition including the algorithm of the barrier synchronization and the execution condition to the setting processing unit 31 of the CPU 3. Also, the JO apparatus 11 outputs the data output from the setting processing unit 31 as circumstances demand.

The setting processing unit 31 transmits a message on the arrival of the barrier point via the system control unit 5 to the barrier synchronization apparatus 6 and also receives a message on an establishment of the barrier synchronization from the barrier synchronization apparatus 6. According to this, while following the setting condition input from the JO apparatus 11, the setting processing unit 31 sets, in the barrier synchronization apparatus 6, a transmission destination of the first barrier synchronization message and a transmission destination of the second barrier synchronization message in the barrier synchronization apparatus 6. While following the setting condition, the barrier synchronization apparatus 6 performs a communication with the barrier synchronization apparatus 6 of the other node 1 via the network 2 and the network interface unit 9 and performs the barrier synchronization on the basis of the relevant communication.

The barrier synchronization apparatus 6 executes the barrier synchronization based on the butterfly. In other words, the barrier synchronization apparatus 6 waits for the data to be received and performs the synchronization by transmitting the data in a case where all the pieces of the data become available. To be more specific, in the parallel computer system of FIG. 1, among the plurality of barrier synchronization apparatuses 6, the synchronization is executed between each of a first set of the plurality of barrier synchronization apparatuses 6 that performs the synchronization. Furthermore, after the synchronization is completed between each of the first set of the plurality of synchronization apparatuses, the synchronization is executed between each of a second set of the plurality of barrier synchronization apparatuses 6 which is a different set from the first set of the plurality of synchronization apparatuses.

The CPU 3 performs a transmission and a reception of data with the memory 4 via the system control unit 5. According to this, the CPU 3 writes the data in the memory 4, and the setting processing unit 31 reads the data from the memory 4. This data is data used for the reduction computation which will be described below, for example.

Figure 3:
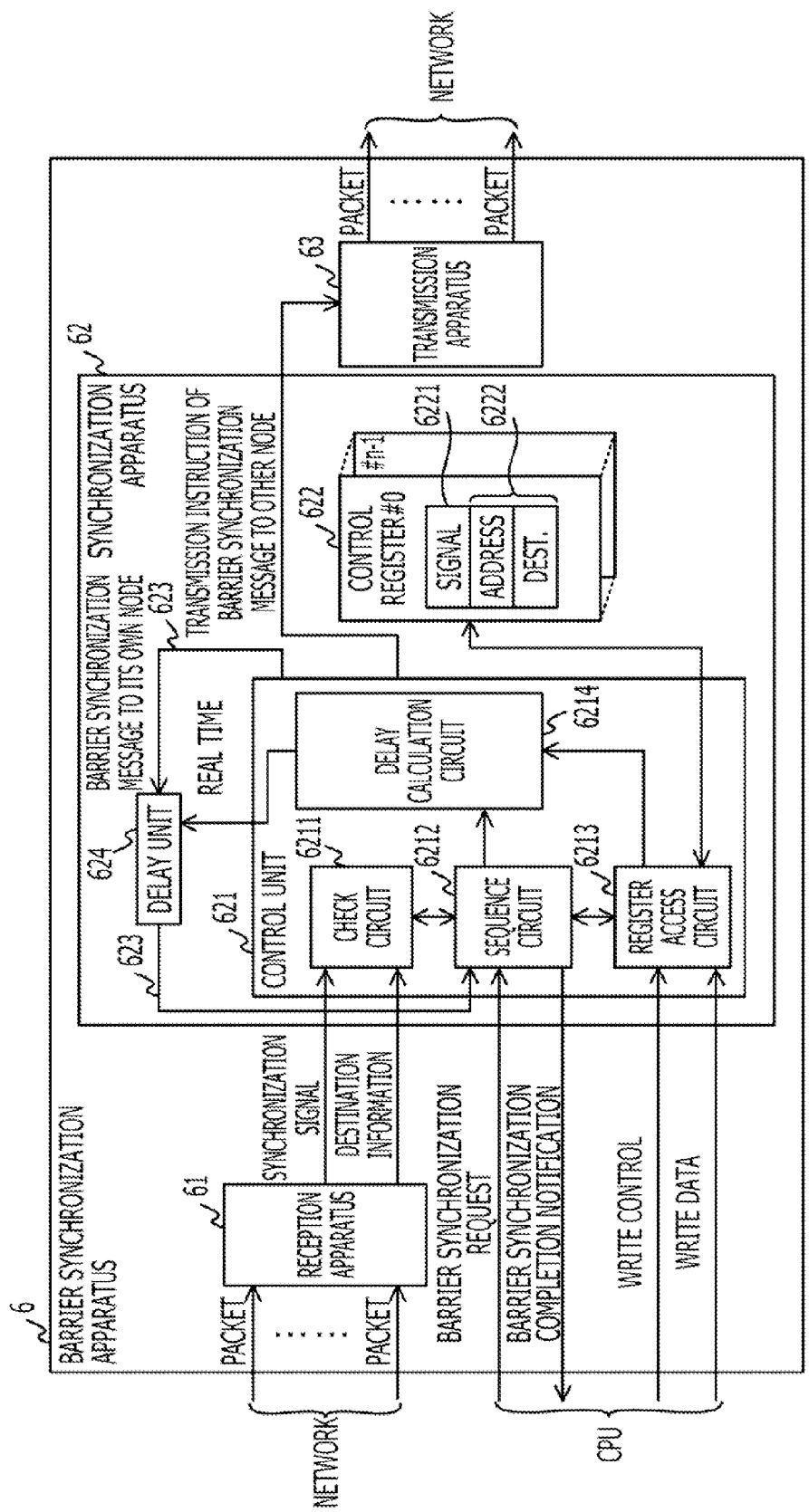
FIG. 3 illustrates an example of a configuration of the barrier synchronization apparatus.

FIG. 3 illustrates an example of a configuration of the barrier synchronization apparatus.

The barrier synchronization apparatus 6 includes a reception apparatus 61, a synchronization apparatus 62, and a transmission apparatus 63. Therefore, the parallel computer system includes the plurality of synchronization apparatuses 62. The synchronization apparatus 62 is a main part of the barrier synchronization apparatus 6 but will be referred to as "synchronization unit 62" in the following description to be distinguished from the barrier synchronization apparatus 6.

The synchronization unit 62 includes a control unit 621, a plurality of control registers 622, a loop path 623, and a delay unit 624. The control unit 621 includes a check circuit 6211, a sequence circuit 6212, a register access circuit 6213, and a delay calculation circuit 6214. As described below, each of the plurality of control registers 622 is a register group further including a plurality of registers illustrated in FIG. 3.

The loop path 623 is a communication path for returning the data transmitted from the control unit 621 to its own node 1 back to the control unit 621. The delay unit 624 is a delay circuit for delaying the data by a specified period of time and is provided in the loop path 623. Therefore, in a case where the data is transmitted to its own node 1, the control unit 621 transmits the data via the loop path 623 and the delay unit 624.

N pieces of control registers 622 are provided, for example, while corresponding to n pieces of sets including #0 to #n−1 of the synchronization messages. In other words, one control register 622 corresponds to one stage in one process. By including the plurality of control registers 622, it is possible to hold the synchronization message in the control register 622 for each of the computations and execute the barrier synchronization. Therefore, in a case where one set of computations is composed of n pieces of first synchronization messages, the synchronization unit 62 executes the barrier synchronization with regard to each of the plurality of sets each of which is composed of n pieces of first synchronization messages. In this case, a plurality of processes are operated on one piece of the node 1.

In the example of FIG. 2, the plurality of processes are operated on one piece of the node 1, and also, one set of computations is executed, so that the barrier synchronization can be executed with regard to this one set of computations. Also, in the example of FIG. 2, one processing can be operated on one piece of the node 1 instead of the embodiment in which the plurality of processes are operated on one piece of the node 1. In this case, the process and the node 1 may be treated similarly.

Referring back to FIG. 3, each of the control registers 622 includes a signal register 6221 and a destination register 6222. The destination register 6222 is a register group including a plurality of registers. For example, each of the control registers 622 includes a reception state register, in other words, the signal register 6221 and the destination register 6222.

The control unit 621 holds synchronization information from two or more synchronization apparatuses that perform the synchronization in the signal register 6221. The two or more barrier synchronization apparatuses 6 that perform the synchronization include its own node 1. In a case where all the pieces of synchronization information from the two or more barrier synchronization apparatuses 6 that perform the synchronization are held in the signal register 6221, the control unit 621 transmits the data to the two or more barrier synchronization apparatuses 6 that perform the synchronization including its own node 1. In other words, in a case where the synchronization information extracted by the reception apparatus 61 and the synchronization information from its own control unit 621 all become available at the control register 622 (in a case where all the pieces of synchronization information become available), the control unit 621 transmits the data to the other node 1 to the transmission apparatus 63 and returns the data to its own node 1 via the delay unit 624 back to its own control unit 621.

To be more specific, on the basis of the synchronization information held in the signal register 6221, among the two or more synchronization apparatuses that perform the synchronization, the control unit 621 transmits the data to the other node 1 to the transmission apparatus 63. Also, on the basis of the synchronization information held in the signal register 6221, among the two or more synchronization apparatuses that perform the synchronization, the control unit 621 delays the data to its own node 1 through the intermediary of the delay unit 624 by a specified period of time with respect to the data to the other node 1 to be returned back to its own control unit.

The control unit 621 executes a check processing on the consistency of the packets received by the respective processes in the check circuit 6211. The check circuit 6211 takes in the synchronization message from the reception apparatus 61 and the destination information and executes the check processing on the consistency of the packets on the basis of the synchronization message and the destination information. The check circuit 6211 inputs a check result on the consistency of the packets to the sequence circuit 6212. For example, on the basis of the synchronization message and the destination information, the check circuit 6211 determines whether or not a sequence number of the received packet is correct. In a case where the sequence number is correct, the synchronization message is held in the signal register 6221 in actuality. In a case where the sequence number is correct, the check circuit 6211 instructs the sequence circuit 6212 to execute the determination processing for determining whether or not the barrier synchronization is established.

The control unit 621 outputs the transmission instruction of the message on the barrier synchronization to the transmission apparatus 63 in the sequence circuit 6212. According to this, the transmission apparatus 63 transmits the message on the barrier synchronization, for example, to the other node 1. The sequence circuit 6212 takes in the reference result of the control register 622 by the register access circuit 6213 and the barrier issuance instruction from the CPU 3 and determines whether or not the barrier synchronization is established on the basis of the reference result and the barrier issuance instruction. In the sequence circuit 6212, in a case where the barrier synchronization is established, the control unit 621 outputs the transmission instruction of the message on the barrier synchronization to the transmission apparatus 63 and transmits the notification on the establishment of the barrier synchronization to the CPU 3.

Also, in the sequence circuit 6212, in a case where the barrier synchronization is established, the control unit 621 returns the transmission instruction of the message on the barrier synchronization via the loop path 623 and the delay unit 624 back to its own control unit, in other words, performs the input again. According to this, the control unit 621 transmits the message on the barrier synchronization to its own node 1. The sequence circuit 6212 takes in the reference result of the control register 622 by the register access circuit 6213 and the barrier issuance instruction from the CPU 3 and transmits the message on the barrier synchronization to itself on the basis of the reference result and the barrier issuance instruction.

In a case where the message on the barrier synchronization is transmitted to its own node 1, the sequence circuit 6212 instructs the delay calculation circuit 6214 to calculate a delay value. At this time, the register access circuit 6213 transmits the reference result of the control register 622 to the delay calculation circuit 6214 while following the instruction of the sequence circuit 6212.

The control unit 621 sets setting information in the destination register 6222 of the control register 622 in the register access circuit 6213. The setting information is input as write data from the setting processing unit 31 of the CPU 3. The control register 622 that sets the setting information is input from the setting processing unit 31 of the CPU 3 as a write control signal including the write address.

The control unit 621 refers to the control register 622 in the register access circuit 6213 and transmits the synchronization message for the barrier synchronization on the basis of the reference result of the control register 622 in the sequence circuit 6212. The register access circuit 6213 refers to the control register 622 in the sequence circuit 6212. The transmission of the synchronization message is performed by the transmission apparatus 63 in response to the instruction of the sequence circuit 6212. In the control register 622, the signal register 6221 stores synchronization information indicating whether or not the synchronization message is received from a process or a node corresponding to the control register 622 which will be described below. In other words, the signal register 6221 stores synchronization information indicating the waiting state for the synchronization message. The destination register 6222 stores setting information including transmission destination information indicating a process or a node that is a destination to which the control register 622 should transmit the synchronization message and that corresponds to the control register 622 and is a transmission source for transmitting the synchronization message. In other words, the destination register 6222 stores the information indicating the transmission destination and the transmission source of the synchronization message after the synchronization establishment.

The synchronization information is information indicating a state of the synchronization which is decided on the basis of the synchronization information included in the synchronization message and is information held in the signal register 6221. A signal synchronization included in the synchronization message is information included in the message on the barrier synchronization and includes, as will be described below with reference to FIG. 5, for example, a type, a destination node address, a transmission source node address, a transmission source stage number, a destination stage number, and a sequence number. The synchronization signal is transmitted and received in a form of being included in the message on the barrier synchronization. Therefore, the conduct of the transmission and the reception of the synchronization signal means the conduct of the transmission and the reception of the message on the barrier synchronization including the synchronization signal. The synchronization signal included in the message on the barrier synchronization is extracted from the message on the barrier synchronization.

The destination register 6222 stores setting information. To be more specific, the destination register 6222 stores the setting information including "the destination node address", "the destination stage number", "the transmission source node address", and "the transmission source stage number". It should be noted that in the destination register 6222, a register storing "the destination node address" and "the destination stage number" is represented as "Dest.", and a register storing "the transmission source node address" and "the transmission source stage number" is represented as "Address". The destination node address and the like will be described below with reference to FIG. 5. By specifying the setting information, the one control register 622 in one piece of the node 1 is decided.

In a case where the transmission destination of the synchronization message is its own node 1, the destination register 6222 stores the setting information for specifying the control register 622 of its own process or its own node 1.

Prior to the execution of the barrier synchronization, the setting condition is input from the IO apparatus 11 to the setting processing unit 31. In this example, in the setting condition, the algorithm of the barrier synchronization is set as the butterfly, and the execution condition is set as four processes, for example. In addition to this, as the execution condition, the number of stages k in the relevant computation, in this instance, the barrier synchronization and the process number i of each process itself, in this instance, its own node 1 are also input.

It should be noted that the input of the setting information to the setting processing unit 31 is not limited to this. For example, any one of the nodes 1 may also input each setting condition to the other node 1 via the network 2. Also, a computer for a management which is connected to the network 2 may input each setting condition to all the nodes 1 via the network 2.

Also, prior to the execution of the barrier synchronization, the setting processing unit 31 of the CPU 3 sets the abovementioned setting information in the control register 622 via the control unit 621 on the basis of the setting condition. As described above, the setting condition includes the algorithm of the barrier synchronization and the execution condition.

After this setting, the barrier synchronization is started when the setting processing unit 31 transmits a barrier synchronization start signal to the control unit 621. In a case where the synchronization is established in the last stage of the process, the synchronization unit 62 sends a signal indicating the barrier synchronization establishment, in this instance, the barrier synchronization completion to the setting processing unit 31.

In the delay calculation circuit 6214, while following the instruction of the sequence circuit 6212, on the basis of the reference result of the control register 622 from the register access circuit 6213, the control unit 621 calculates a delay value. The delay calculation circuit 6214 transmits the calculated delay value to the delay unit 624. The calculated delay value is an actual time of the delay in the delay unit 624.

The delay calculation circuit 6214 calculates the delay value as follows.

Figure 4:
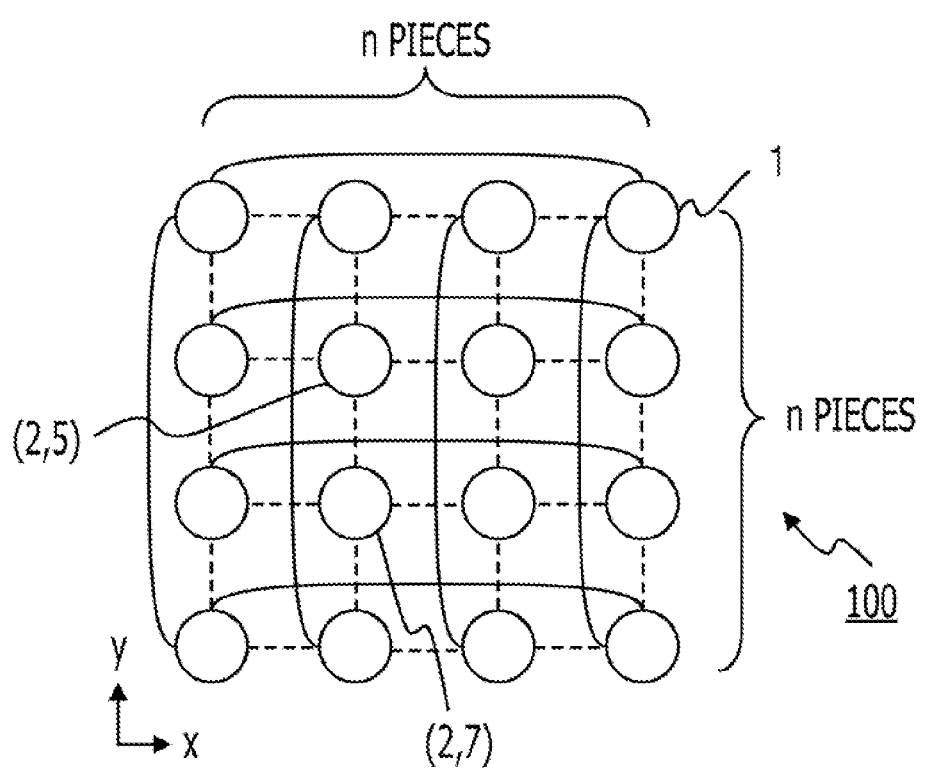
FIG. 4 illustrates an example of a delay calculation.

For example, as illustrated in FIG. 4, the parallel computer system is set to include a computer network 100 including the plurality of nodes 1 logically subjected to a two-dimensional torus coupling. The network 2 connects the plurality of nodes 1. In the parallel computer system of FIG. 4, a distance between the logically adjacent nodes 1 is set as "1 hop". A communication delay time per hop is set as "Td". The communication delay time Td is a time equal to a time required for the transmission of the barrier synchronization apparatus 6 of the data to the other node 1, in other words, the message on the barrier synchronization by the barrier synchronization apparatus 6 and can be previously found out empirically.

As illustrated in FIG. 4, in the parallel computer system, it is assumed that its own node address on the logical network is (X, Y)=(2, 5) and the destination node address is (X, Y)=(2, 7). Herein, X and Y each indicate an x coordinate and a y coordinate of the network address in the two-dimensional logical network.

In this case, the number of hops between its own node 1 and the destination node 1 in an X axis direction is 2−2=0. Also, the number of hops between its own node 1 and the destination node 1 in a Y axis direction is 7−5=2. Therefore, the number of hops between its own node 1 and the destination node 1 is "2 hops" in the Y axis direction. According to this, the delay value between its own node 1 and the destination node 1 in the example of FIG. 4 becomes (the number of hops)×(the communication delay time per hop)=2Td.

The delay calculation circuit 6214 calculates the number of hops between its own node 1 and the destination node 1 on the basis of its own node address and the destination node address included in the message on the barrier synchronization. Furthermore, the delay calculation circuit 6214 multiplies the calculated number of hops by the communication delay time per hop to calculate the delay value and sets the calculated delay value in the delay unit 624.

It should be noted that like a computer network subjected to a three-dimensional mesh coupling, the parallel computer system may be an n-dimensional computer network to which the logically adjacent node 1 is connected. Herein, n is an integer larger than or equal to 2.

The reception apparatus 61 is a reception unit that is connected to the other node 1 via the network 2 and the network interface unit 9. The reception apparatus 61 receives the data from the barrier synchronization apparatus 6 of the other node 1 that performs the synchronization with its own node 1 among the plurality of barrier synchronization apparatuses 6 in the parallel computer system and extracts the synchronization information from the received data from the barrier synchronization apparatus 6 of the other node 1.

To be more specific, the reception apparatus 61 receives the packet for the barrier synchronization from the other node 1, in other words, the data for the barrier synchronization. In a case where a first barrier synchronization message where the transmission destination is previously set while following the setting condition including the algorithm of the barrier synchronization and the execution condition is received, the reception apparatus 61 transmits the received first barrier synchronization message to the synchronization unit 62. For this reason, the reception apparatus 61 receives the packet for the barrier synchronization from the barrier synchronization apparatus 6 of the other node 1 via the network 2.

On the other hand, as described above, the packet for the barrier synchronization from its own node 1, in other words, the data for the barrier synchronization is transmitted and received via the loop path 623 and the delay unit 624. Therefore, the reception apparatus 61 does not receive the packet for the barrier synchronization from its own node 1.

In a case where the packet is received, on the basis of the received packet, the reception apparatus 61 generates the synchronization signal and the destination information to be transmitted to the synchronization unit 62. To be more specific, the reception apparatus 61 takes out the synchronization signal and the destination information included in the received packet to be transmitted to the synchronization unit 62. The synchronization signal and the destination information will be described below with reference to FIG. 5.

It should be noted that in a case where the plurality of nodes at the transmission source exist, when the network interface units 9 by the number corresponding to the number of the nodes 1 where the reception apparatus 61 becomes the transmission source are included, it is possible to receive the packets transmitted from the plurality of nodes at the same time by using the plurality of reception apparatuses 61. This applies similarly also in the transmission apparatus 63.

FIG. 5 illustrates a format of the packet.

The packet mutually transmitted and received between the processing #0 to the processing #3 has a format illustrated in FIG. 5, for example. The packet includes, for example, a header CRC (Cyclic Redundancy Check), a routing header, a type, a destination node address, a transmission source node address, a transmission source stage number, a destination stage number, a sequence number, and a packet CRC (Cyclic Redundancy Check). The synchronization signal included in the packet is, for example, the type, the destination node address, the transmission source node address, the transmission source stage number, the destination stage number, and the sequence number. The destination information is, for example, the destination node address and the destination stage number.

The header CRC is an error detecting code for the routing header. The routing header is information for deciding the next destination in the transmission of the packet by the router. The router is a relay apparatus included in the network interface that executes the transfer of the packet in the network 2.

The type is information indicating a type of the packet. In other words, in a case where the type is a type indicating the barrier, it is indicated that the packet is the message on the barrier synchronization.

The destination node address indicates an address on the network 2 of the destination node 1 of the packet. When the barrier synchronization apparatus 6 transmits the barrier packet in the respective stages, the destination node address previously set in the setting information register of the barrier synchronization apparatus 6 is embedded in the packet.

The transmission source node address indicates an address on the network 2 of the node 1 at the packet transmission source. When the barrier synchronization apparatus 6 transmits the barrier packet in the respective stages, its own node address is embedded in the packet. (The control unit 621 of) the barrier synchronization apparatus 6 that has received the packet compares the value in the present field with the transmission source node address previously set in the setting information register of the barrier synchronization apparatus 6, which is used for the determination on the approval/disapproval of the reception of the packet.

The transmission source stage number is a stage number in the barrier synchronization apparatus 6 of the node 1 at the packet transmission source. When the barrier synchronization apparatus 6 transmits the barrier packet corresponding to the barrier synchronization message in the respective stages, the stage number is embedded in the packet as the transmission source stage number. The control unit 621 of the barrier synchronization apparatus 6 that has received the packet compares the value in the present field with the transmission source stage number previously set in the setting information register of the barrier synchronization apparatus 6, which is used for the determination on the approval/disapproval of the reception of the packet.

The transmission destination stage number indicates a stage number of the barrier synchronization apparatus 6 at the packet transmission destination. When the barrier synchronization apparatus 6 transmits the barrier packet corresponding to the barrier synchronization message in the respective stages, the destination stage number previously set in the setting information register of the barrier synchronization apparatus 6 is embedded in the packet. The control unit 621 of the barrier synchronization apparatus 6 that has received the packet refers to the value in the present field, which is used for the selection of the setting information register (stage selection).

The sequence number is a number added when the barrier synchronization apparatus 6 transmits the barrier packet corresponding to the barrier synchronization message in the respective stages.

The packet CRC is an error detecting code for the entire packets.

Referring back to FIG. 3, the synchronization unit 62 performs the processing for the barrier synchronization on the basis of the synchronization signals and the destination information from the reception apparatus 61 and the control unit 621 of its own node 1. For this, the synchronization unit 62 waits for plural sets of the synchronization signals (the barrier synchronization messages) and transmits the message on the barrier synchronization as the synchronization signal to the transmission destination specified by the destination information after the synchronization establishment in the respective sets. According to this, in the algorithm with which the barrier synchronization is carried out, it is possible to promptly perform the processing of changing the transmission destination of the signal arriving at the barrier point for each of the stages. To each of the sets of the synchronization signals (the barrier synchronization messages), the uniquely decided setting information is allocated. The synchronization unit 62 receives the message on the barrier synchronization as the synchronization signal and outputs the corresponding synchronization signal with respect to the set where the synchronization is established.

For example, with regard to each of the sets of the synchronization signals (the barrier synchronization messages), the synchronization unit 62 sets out the synchronization unit 62 for n (n is a positive integer) pieces of the first barrier synchronization messages previously set while following the setting condition. In the respective sets, in a case where n pieces of the barrier synchronization messages are input, the synchronization is established. After the synchronization is established, the synchronization unit 62 instructs the transmission apparatus 63 to transmit a second barrier synchronization message. Herein, m (m is a positive integer) pieces of the second barrier synchronization messages are set, and the transmission destination is previously set for each of the messages while following the setting condition.

In a case where the synchronization is established, with regard to the respective sets, the synchronization unit 62 transmits the barrier synchronization message to a previously set transmission destination. The transmission destination is the synchronization unit 62 of the other node 1 or the control unit 621 of its own node 1. In a case where the transmission destination of the barrier synchronization message is the other node 1, the setting information including the destination node address of the transmission destination node 1 is previously set in the synchronization unit 62. In this case, the synchronization unit 62 sends a signal of a packet transmission instruction to the transmission apparatus 63. The transmission apparatus 63 that has received the packet transmission instruction from the synchronization unit 62 transmits the packet for the barrier synchronization to the barrier synchronization apparatus 6 of the other node 1 specified by the destination node address via the network 2.

On the other hand, in a case where the transmission destination of the barrier synchronization message is its own node, the setting information for instructing the control unit 621 of its own node 1 is previously set in the synchronization unit 62. The synchronization unit 62 transmits the barrier synchronization message to the specified control register 622 in the control unit 621 of its own process or its own node 1. When the transmission of the barrier synchronization message to the control unit 621 of its own node 1 is executed, the barrier synchronization message is transmitted from the control unit 621 via the loop path 623 to the delay unit 624 in actuality. According to this, the period of time until the barrier synchronization message is input to the control unit 621 is delayed by a specified period of time. The barrier synchronization message to its own node 1 includes a part of the synchronization signal in the packet of FIG. 5, for example.

It should be noted that in a case where the signal of the barrier synchronization start is received from the setting processing unit 31 of the CPU 3, the synchronization unit 62 sends the barrier synchronization message to the specified transmission destination. In a case where the synchronization is established in the last set of the barrier synchronization messages, the synchronization unit 62 notifies the setting processing unit 31 of the CPU 3 of the signal of the barrier synchronization completion.

The transmission apparatus 63 is a transmission unit that is connected to the other node 1 via the network 2 and the network interface unit 9. The transmission apparatus 63 transmits the barrier synchronization apparatus 6 of the data to the other node 1 which performs the synchronization with its own node 1 among the plurality of barrier synchronization apparatuses 6 in the parallel computer system. The two or more barrier synchronization apparatuses 6 that perform the synchronization include the barrier synchronization apparatus 6 of its own node 1.

To be more specific, the transmission apparatus 63 transmits the packet for the barrier synchronization to the other node 1, in other words, the data for the barrier synchronization. In a case where the first barrier synchronization message is transmitted where the transmission destination is previously set while following the setting condition including the algorithm of the barrier synchronization and the execution condition, the transmission apparatus 63 transmits the transmitted first barrier synchronization message to the synchronization unit 62. For this reason, the transmission apparatus 63 transmits the packet for the barrier synchronization to the barrier synchronization apparatus 6 of the other node 1 via the network 2.

Also, the transmission apparatus 63 transmits the packet for the barrier synchronization, in other words, the data for the barrier synchronization to the control unit 621 of the barrier synchronization apparatus 6 of its own node 1. In this case, the packet for the barrier synchronization is transmitted and received via the loop path 623 and the delay unit 624 as described above. Therefore, as described above, the transmission apparatus 63 does not transmit the message on the barrier synchronization to its own node 1.

In a case where the instruction of the transmission from the synchronization unit 62 is received, the transmission apparatus 63 transmits the second barrier synchronization message to m pieces of previously set transmission destinations. For this reason, the transmission apparatus 63 receives a signal of the packet transmission instruction from the synchronization unit 62 and generates the packet on the basis of the specified transmission destination to be transmitted to the other node 1 via the network 2. As described above, the node 1 that becomes the transmission destination is decided on the basis of the setting information.

Figure 6:
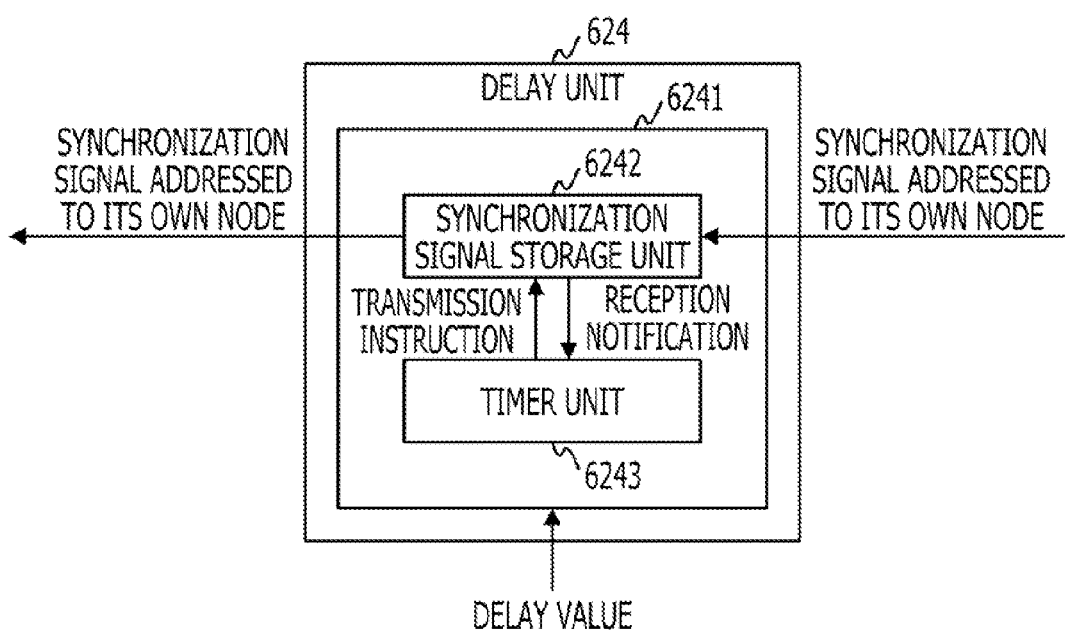
FIG. 6 illustrates an example of a configuration of a delay unit.

FIG. 6 illustrates an example of a configuration of the delay unit.

The delay unit 624 includes one delay circuit 6241. The delay circuit 6241 includes a synchronization signal storage unit 6242 and a timer unit 6243. The synchronization signal storage unit 6242 is a register that receives the message on the barrier synchronization addressed to its own node 1 from the control unit 621 and temporarily stores the received message on the barrier synchronization. The timer unit 6243 counts the delay value instructed from the control unit 621.

For example, the synchronization signal storage unit 6242 receives the message on the barrier synchronization addressed to its own node 1 from the control unit 621. The synchronization signal storage unit 6242 that has received the message on the barrier synchronization addressed to its own node 1 outputs a reception notification of the message on the barrier synchronization to the timer unit 6243 and also temporality stores the message on the barrier synchronization addressed to its own node 1. The timer unit 6243 has received the reception notification starts the count and outputs the transmission instruction of the message on the barrier synchronization to the synchronization signal storage unit 6242 when the count value reaches the delay value. In the timer unit 6243, the count value is set to "0" again when the count value reaches the delay value.

The synchronization signal storage unit 6242 that has received the transmission instruction of the message on the barrier synchronization outputs the temporality stored message on the barrier synchronization addressed to its own node 1 to the control unit 621. After this output, the synchronization signal storage unit 6242 deletes the temporality stored message on the barrier synchronization addressed to its own node 1.

A configuration of the delay unit 624 is not limited to the configuration of FIG. 6, and various configurations can be adopted.

Figure 7:
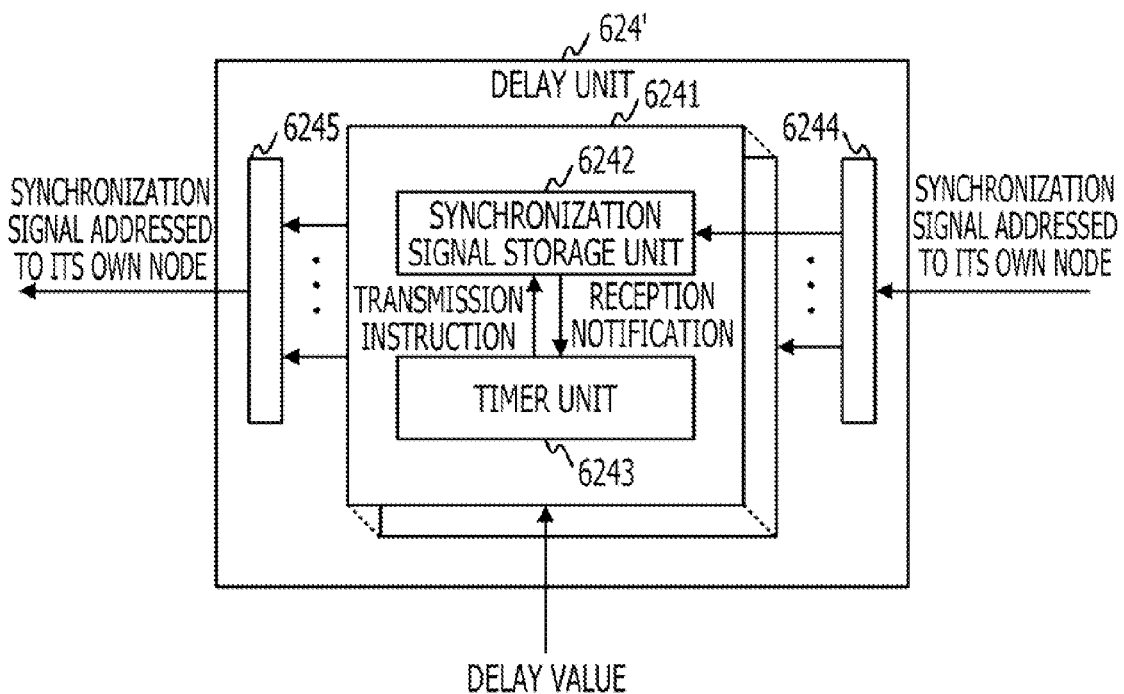
FIG. 7 illustrates another example of the configuration of the delay unit.

For example, as illustrated in FIG. 7, a delay unit 624' may include one input circuit 6244, the plurality of delay circuits 6241, and one output circuit 6245. Each of the delay circuits 6241 includes the synchronization signal storage unit 6242 and the timer unit 6243.

In FIG. 7, each of the plurality of delay circuits 6241 is provided while corresponding to each of the plurality of control registers 622. On the basis of the received message on the barrier synchronization, the input circuit 6244 selects the delay circuit 6241 corresponding to the control register 622 that processes the received message on the barrier synchronization and inputs the received message on the barrier synchronization to the selected delay circuit 6241. The output circuit 6245 multiplexes the messages on the barrier synchronization output from the plurality of delay circuits 6241 to be output to the control unit 621.

According to this, in a case where a plurality of processes are operated on the one piece of the node 1, with regard to each of the plurality of processes, it is possible to realize the delay processing suitable to each process by using a different delay value for each process. As a result, the fluctuation in the establishment of the synchronization between the plurality of nodes can be virtually eliminated.

The delay unit 624 may also be provided at a location except for the inside of the synchronization unit 62. For example, the delay unit 624 may also be provided inside the control unit 621. Also, the delay unit 624 may be provided outside the synchronization unit 62 and inside the barrier synchronization apparatus 6.

Figure 8:
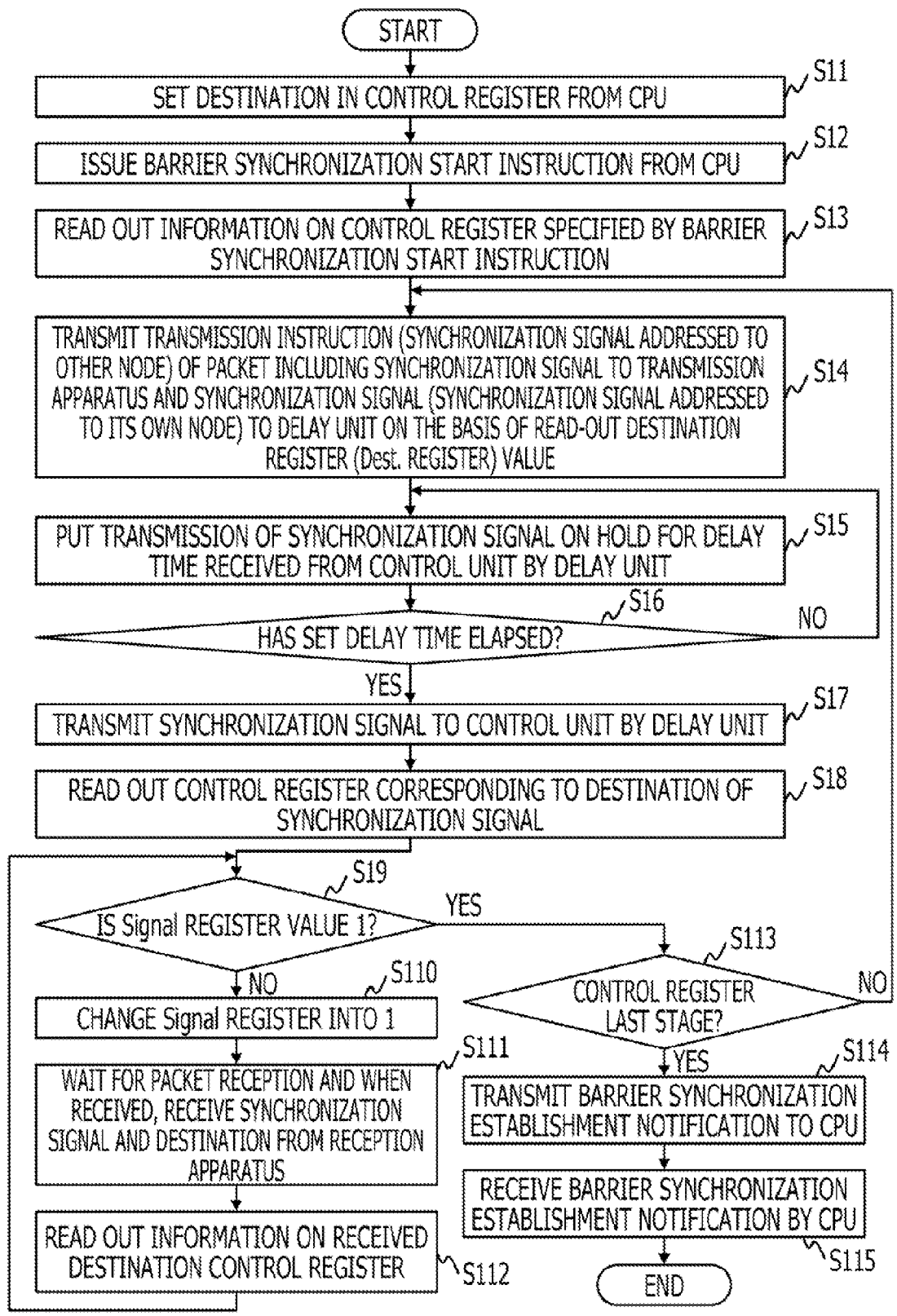
FIG. 8 is a processing flow chart at the time of a barrier synchronization execution.

FIG. 8 illustrates a processing flow of the barrier synchronization processing based on the butterfly which is executed by the barrier synchronization apparatus 6 of FIG. 3.

Before the barrier synchronization is started, the setting processing unit 31 set in the CPU sets the destination node address and the destination stage number corresponding to the next stage in the butterfly in the destination register 6222 of each of the control registers 622 on the basis of the algorithm of the barrier synchronization and the setting condition (operation S11). By setting the destination node address and the destination stage number, as described above, the one control register 622 corresponding to one stage of one process is decided.

For this reason, the setting processing unit 31 inputs the destination stage number of the control register 622 where the destination node address and the destination stage number should be set, in the synchronization unit 62 as the write address. Also, the setting processing unit 31 inputs the destination node address and the destination stage number that should be set in the destination register 6222 of the control register 622 in the control unit 621 of the synchronization unit 62 as the write data. The write address and the write data are input for each of the control registers 622. In accordance with this, the control unit 621 stores the input destination node address and the input destination stage number that are the write data in the destination register 6222 of the control register 622 specified by the write address. In actuality, the storage of the write data is executed by the control unit 621 that has received the write address and the write data from the setting processing unit 31. On the other hand, separately, in addition to this, an initial value of the signal register 6221 is previously set, for example, as "0".

The setting of the destination node address and the destination stage number is carried out as follows, for example. In a case where the number of nodes is a power of 2, in the butterfly, after the synchronization establishment, the barrier synchronization message is transmitted to two locations including the next stage in its own process or its own node and the next stage in the other node. Therefore, the address specified in the destination register 6222 is either the destination stage number of its own process or its own node, or, the destination node address and the destination stage number of the other node.

In the first stage, since the waiting for the barrier synchronization message is not carried out, the signal register 6221 is not used. On the other hand, in the last stage, the destination register 6222 is not used. Therefore, in the first stage and the last stage, the registers to be used are not overlapped with each other. For that reason, the substantially identical control register 622 is specified in the first and last stages. It should be noted that even in a case where the registers used in the first stage and the last stage are not overlapped with each other, the different control registers 622 may also be specified in the first and last stages.

In a case where the number of nodes is not a power of 2, in order that the number of nodes is set as a power of 2, the other node is caused to have the control register 622 provided to an addition node added to the network 2. For example, in a case where the barrier synchronization is set out in the nodes #0 to #3 in FIG. 9, any one of the nodes #0 to #3 is caused to have the control register 622 provided to the node. In this case, since only the control register equivalent to the relay stage is required, any one of the nodes #1 to #3 is caused to have the control register #2 equivalent to the relay stage. Furthermore, in the first stage, the value of the signal register 6221 at the transmission destination of the control register is previously set as "1". In the last stage, the control register in the first stage is removed from the destination register 6222 at the transmission source.

In a case where the process arrives at the barrier point, the setting processing unit 31 sends the signal of the barrier synchronization start to the synchronization unit 62 of the barrier synchronization apparatus 6 (operation S12). The barrier synchronization start signal includes the number of the control register 622 corresponding to the first stage. In the first stage, since the packet including the barrier synchronization message is not received from the other process, the synchronization signal and the destination are not transmitted from the reception apparatus 61 to the control unit 621.

When the signal of the barrier synchronization start is received, the control unit 621 of the synchronization unit 62 reads the value "Destination" of the destination register 6222 of the control register 622 corresponding to the number specified by the barrier synchronization start signal (operation S13). For this reading, the control unit 621 uses the destination stage number specified by the barrier synchronization start signal as a read address and reads the value of the destination register 6222 of the control register 622 at the relevant address as read data. The signal register 6221 of the control register 622 corresponding to the first stage is not used, and therefore, the waiting for the barrier synchronization message is also not carried out.

The control unit 621 outputs the signal of the packet transmission instruction to the transmission apparatus 63 on the basis of the value for specifying the control register 622 of the other node 1 among the values of the destination register 6222 and also transmits the barrier synchronization message to the delay unit 624 on the basis of the value for specifying the control register 622 of its own node 1 among the values of the destination register 6222 (operation S14). The packet transmission instruction includes a value of the destination register 6222 that instructs the other node 1.

The transmission apparatus 63 generates a packet on the basis of the destination node address and the destination stage number specified by the packet transmission instruction from the control unit 621 and transmits the packet to the network 2. This packet is the barrier synchronization message addressed to the other node 1, in other words, the synchronization message including the synchronization signal. The packet transmission destination of this packet is specified the destination node address and the specified destination stage number. On the other hand, the synchronization signal transmitted by the control unit 621 to the delay unit 624 is equivalent to the message on the barrier synchronization addressed to its own node 1. For example, the synchronization signal transmitted by the control unit 621 to the delay unit 624 is obtained by removing the header CRC, the routing header, and the packet CRC from the packet of FIG. 5.

The delay unit 624 puts the transmission of the synchronization signal received from the control unit 621 on hold for a period of time equivalent to the delay value that is received from the control unit 621 (operation S15) and determines whether or not the period of time equivalent to the delay value, in other words, the delay time has elapsed (operation S16). In a case where the delay time has not elapsed (operation S16: No), the delay unit 624 repeats operation S15. In a case where the delay time has elapsed (operation S16: Yes), the delay unit 624 transmits the held synchronization signal to the control unit 621 (operation S17).

The control unit 621 reads the value of the signal register 6221 of the control register 622 specified in the destination register 6222 on the basis of the value for specifying the control register 622 of its own node among the values of the destination register 6222 (operation S18). In other words, the value of the signal register 6221 "signal" of the control register 622 in the next stage of its own node is read. This is because the synchronization signal is sent to the synchronization unit 62 of its own node and the waiting for the synchronization in its own node is carried out.

The control unit 621 checks whether or not "1" indicating the synchronization state is set in the signal register 6221 in the next stage (operation S19). In a case where "1" is set in the signal register 6221 (operation S19: Yes), the synchronization is established. On the other hand, in a case where "1" is not set in the signal register 6221 (operation S19: No), the synchronization is not established.

In a case where the synchronization is not established (operation S19: No), the synchronization unit 62 sets a value Signal of the signal register 6221 of the control register 622 in the next stage as "1" and thereafter waits for the reception of the packet (operation S110). For this setting, the control unit 621 uses the value for specifying its own node among the read values of the destination register 6222 as the write address and writes "1" in the signal register 6221 of the control register 622 at the relevant address as the write data. According to this, it is indicated that one of the synchronization signals that should be waited for is received.

After this, in a case where the packet is received, on the basis of the received packet, the reception apparatus 61 takes out the synchronization signal as well as the destination node address and the destination stage number that become the destination to be transmitted to the synchronization unit 62 (operation 5111).

In a case where the signal from the reception apparatus 61 is received, the control unit 621 of the synchronization unit 62 reads the value of the signal register 6221 of the specified control register 622 (operation S112). After this, operation S19 is repeated. For example, when the synchronization signal from the reception apparatus 61 and the destination are received, on the basis of the received destination stage number, the control unit 621 reads the value of the signal register 6221 of the control register 622. For this reading, the control unit 621 uses the specified destination stage number as the read address and reads the value of the signal register 6221 of the control register 622 at the relevant address as the read data.

On the other hand, in a case where the synchronization is established in operation S19 (operation S19: Yes), the control unit 621 further checks whether or not the control register 622 corresponds to the last stage (operation S113). For example, in a case where after operation S110 is executed first, operation S19 is executed again, the value of the signal register 6221 of the control register 622 is "1". Therefore, in this case, the synchronization is established.

In a case where the synchronization is established in the control register 622 corresponding to the last stage (operation S113: Yes), the control unit 621 sends the signal of the barrier synchronization establishment to the setting processing unit 31 of the CPU (operation S114). The setting processing unit 31 receives the signal of the barrier synchronization establishment from the control unit 621 and finds out the barrier synchronization establishment (operation S115).

In a case where the control register 622 does not correspond to the last stage in operation S113 (operation S113: No), the control unit 621 repeats operation S14.

Figure 9:
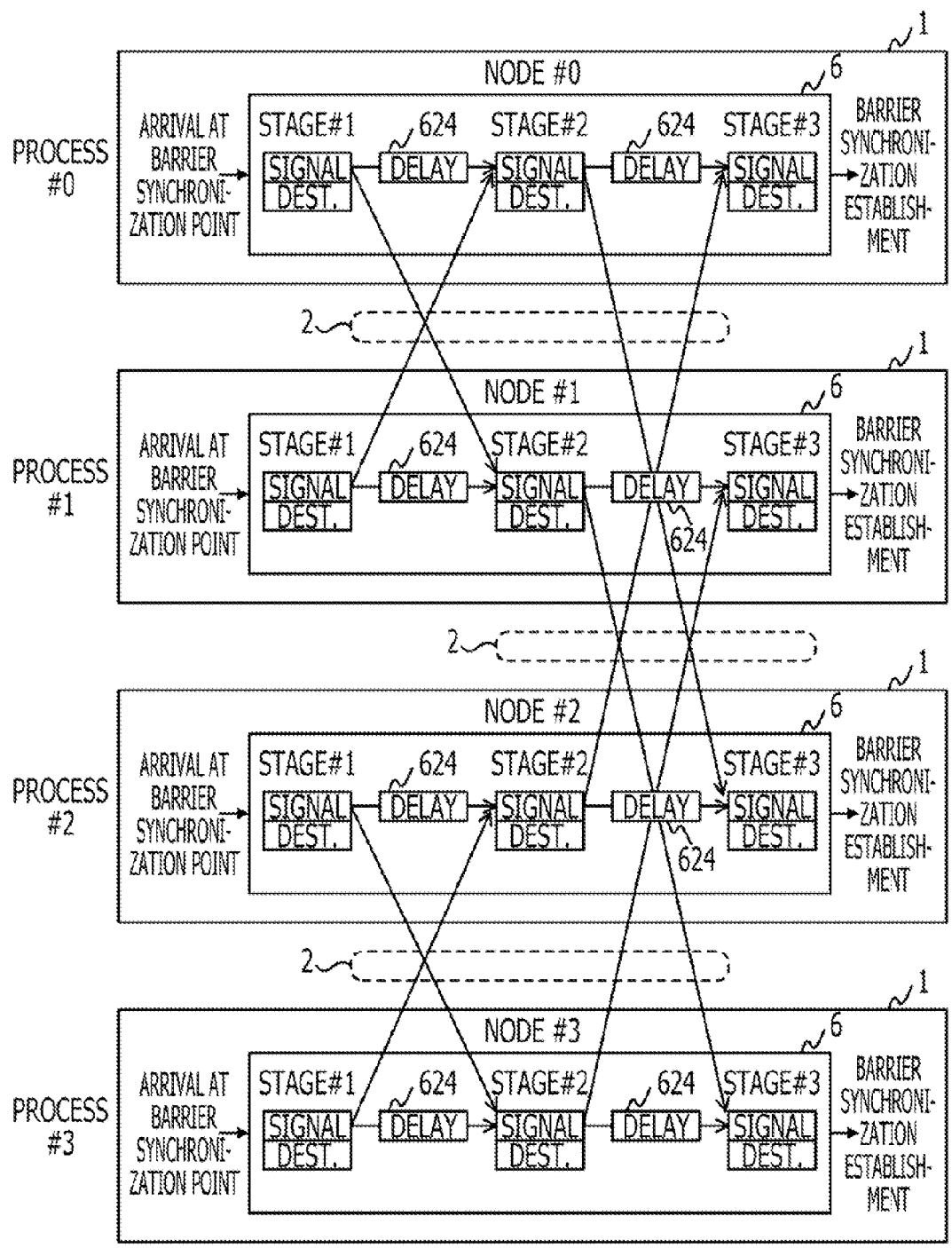
FIG. 9 illustrates flows of signals in the barrier synchronization based on butterfly.

FIG. 9 illustrates a flow of the synchronization message between the respective stages in the barrier synchronization processing based on the butterfly of FIG. 8.

In FIG. 9, when attention is paid to the node #0, the synchronization message flows as described below. For example, in the stage #1, in a case where the node #0 arrives at the barrier point, the synchronization start is instructed by the input of the barrier synchronization start signal. In accordance with this, in the stage #1, the node #0 transmits the synchronization message to the node #0 and the node #1 that are the previously set destinations. The node #0 is its own node 1 for the node #0, and the node #1 is the other node 1 for the node #0.

Herein, the synchronization message from the stage #1 of the node #0 to the other node 1, in other words, the stage #2 of the node #1 arrives at the stage #2 of the node #2 via the network 2. In contrast to this, the barrier synchronization message transmitted from the stage #1 of the node #0 to its own node 1, in other words, the stage #2 of the node #1 is transmitted and received inside the barrier synchronization apparatus 6 of the node #1 via the delay unit 624.

Also, the synchronization message transmitted from the stage #1 of the node #1 to the stage #2 of the node #1, the synchronization message transmitted from the stage #1 of the node #2 to the stage #2 of the node #2, and the synchronization message transmitted from the stage #1 of the node #3 to the stage #2 of the node #3 are also transmitted and received inside the barrier synchronization apparatus 6 of its own node 1 via each of the delay units 624.

In the stage #2, the node #0 that has received its own synchronization signal waits for the barrier synchronization message from the node #1 previously instructed. After the node #1 arrives at the barrier point, similarly, the barrier synchronization message waited for in the stage #2 of the node #0 arrives at the node #0 from the node #1. In a case where in the node #0 in which the barrier synchronization message from the node #1 arrives, the waiting for its own synchronization signal and the synchronization signal included in the barrier synchronization message from the node #1, in this instance, the synchronization of the two signals is established.

At this time, as described above, its own synchronization signal is received via the delay unit 624 where the delay equivalent to the network 2 is generated, and the barrier synchronization message from the other node 1 is received via the network 2. According to this, in each stage #2 of the nodes #0 to the node #3, the synchronization is established at substantially the same time. As a result, in the barrier synchronization, the fluctuation in the establishment of the synchronization between the plurality of nodes can be virtually eliminated.

When the synchronization is established in the stage #2, the node #0 transmits the synchronization signal to the node #0 that is the previously instructed destination and transmits the barrier synchronization message to the node #2.

Herein, the barrier synchronization message transmitted from the stage #2 of the node #0 to the stage #3 of the node #2 arrives at the stage #3 of the node #2 via the network 2. In contrast to this, the synchronization signal transmitted from the stage #2 of the node #0 to the stage #3 of the node #0 is transmitted and received inside the barrier synchronization apparatus 6 of the node #0 via the delay unit 624. The synchronization signal transmitted from the stage #2 of the node #1 to the stage #3 of the node #1, the synchronization signal transmitted from the stage #2 of the node #2 to the stage #3 of the node #2, and the synchronization signal transmitted from the stage #2 of the node #3 to the stage #3 of the node #3 are also transmitted and received inside the barrier synchronization apparatus 6 of its own node 1 via each of the delay units 624.

In the stage #3, the node #0 that has received its own synchronization signal waits for the barrier synchronization message from the previously instructed node #2. After the node #2 arrives at the barrier point and also the barrier synchronization message from the node #4 that has arrived at the barrier point is received, similarly, the barrier synchronization message waited for in the stage #3 of the node #0 arrives at the node #0 from the node #2. In a case where the barrier synchronization message from the node #2 arrives, in the node #0, the synchronization between its own synchronization signal and the barrier synchronization message from the node #2 is established.

At this time, as described above, its own synchronization signal is received via the delay unit 624 where the delay equivalent to the network 2 is generated, and the barrier synchronization message from the other node 1 is received via the network 2. According to this, in each stage #2 of the node #0 to the node #3, the synchronization is established at substantially the same time. As a result, in the barrier synchronization, the fluctuation in the establishment of the synchronization between the plurality of nodes can be virtually eliminated.

When the synchronization is established in the stage #3, it is determined that the barrier synchronization is established, and the node #0 outputs the barrier synchronization establishment signal.

In the nodes #1 to #3 too, similarly, in the stage #3, the barrier synchronization is established, and the barrier synchronization establishment signal is output. According to this, the barrier synchronization based on the butterfly is executed.

Next, a description will be given of a parallel computer including a reduction computation apparatus which performs the reduction computation while the barrier synchronization based on the butterfly is carried out.

Figure 10:
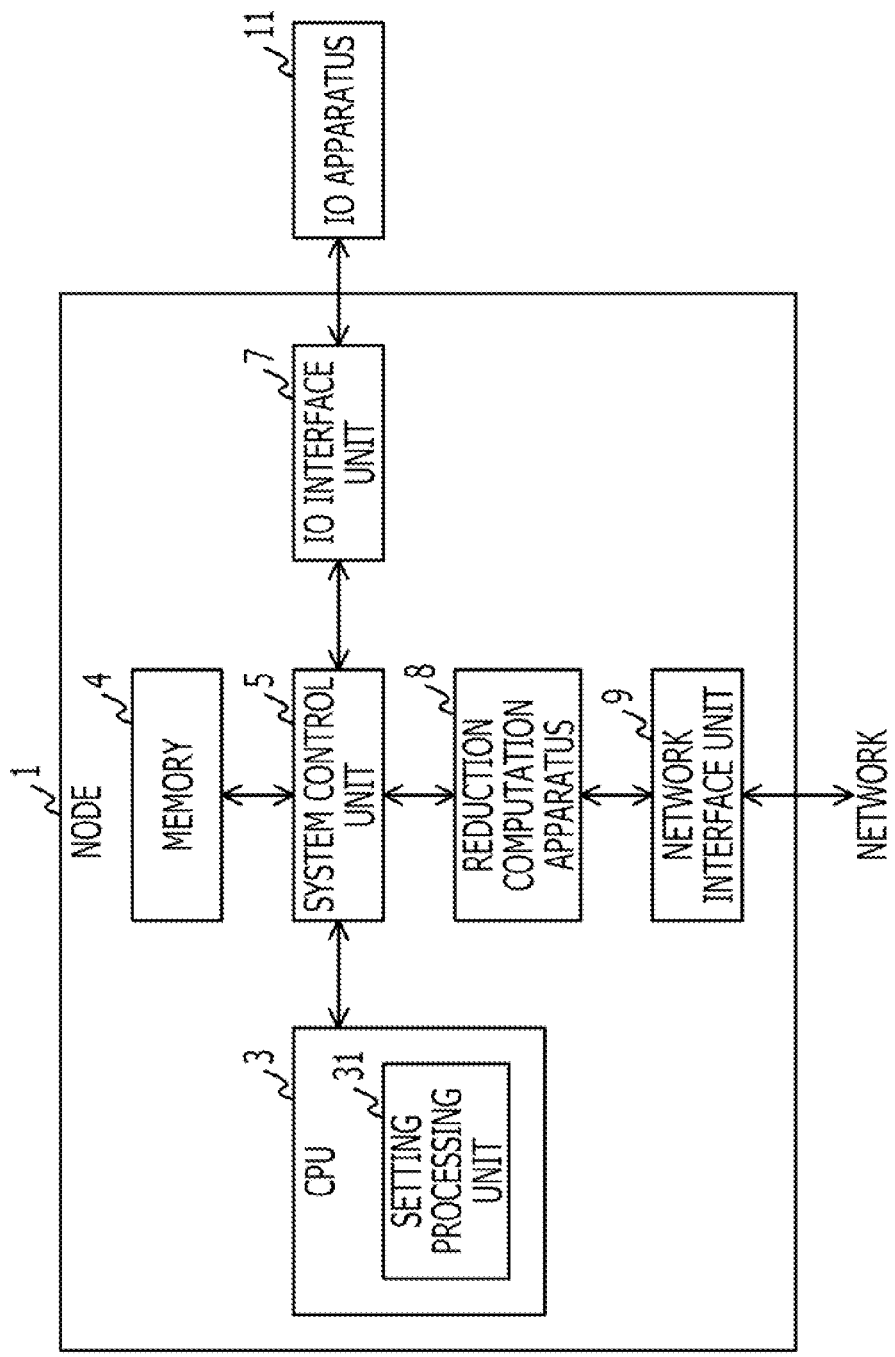
FIG. 10 illustrates an example of a configuration of a node including a reduction computation apparatus.
Figure 11:
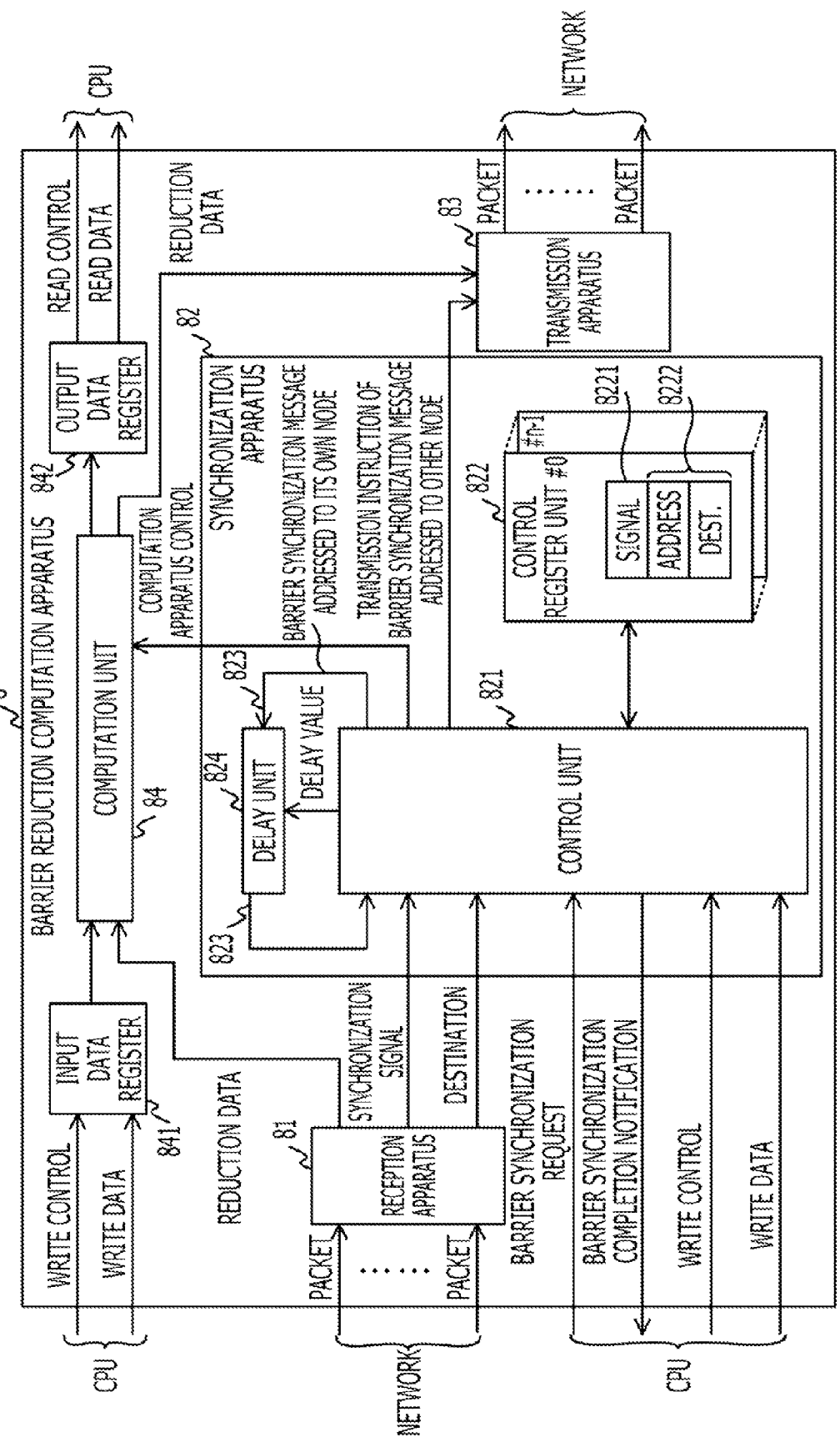
FIG. 11 illustrates an example of a configuration of the reduction computation apparatus.

FIG. 10 illustrates an example of a configuration of a node including reduction computation apparatus that performs a reduction computation while the barrier synchronization based on the butterfly is carried out. FIG. 11 illustrates an example of a configuration of the reduction computation apparatus of FIG. 10.

The reduction computation apparatus 8 of FIG. 10 is provided to the node 1 that forms the parallel computer system illustrated in FIG. 1. In the example of FIG. 10, the node 1 includes a configuration in which the barrier synchronization apparatus 6 of the node 1 illustrated in FIG. 2 is substituted by the reduction computation apparatus 8. That is, the node 1 in the example of FIG. 10 includes a configuration similar to the node 1 illustrated in FIG. 2 except for the barrier synchronization apparatus 6. Hereinafter, an illustration or a description may be omitted in some cases with regard to the elements also illustrated in FIG. 2 to FIG. 6. Also, in FIG. 11, the reduction computation apparatus 8 is mentioned as barrier/reduction computation apparatus 8.

The reduction computation apparatus 8 performs the reduction computation while the barrier synchronization is set out. The reduction computation apparatus 8 includes a reception apparatus 81, a synchronization apparatus 82, a transmission apparatus 83, a computation apparatus 84, and a loop path 823. The synchronization apparatus 82 includes a control unit 821 and a control register 822. It should be noted that in the following description, the synchronization apparatus 82 is referred to as "synchronization unit 82", and the computation apparatus 84 is referred to as "computation unit 84". Also, the control unit 821 has a configuration substantially similar to the control unit 621 of FIG. 3, but an illustration thereof will be omitted.

As illustrated in FIG. 11, the reduction computation apparatus 8 has a configuration similar to the barrier synchronization apparatus 6 except for the computation unit 84 as well as an input data register 841 and an output data register 842 which are peripheral circuits of the computation unit 84. Since the computation unit 84 is included, the signal of the reduction computation start is input to the reduction computation apparatus 8 instead of the signal of the barrier synchronization start, and also, the reduction computation apparatus 8 outputs the signal of the reduction computation completion instead of the signal of the barrier synchronization establishment.

Also, since the computation unit 84 is included, the reduction computation apparatus 8 performs the transmission and the reception of the data with the network 2 in addition to the transmission and the reception of the packet and also performs the transmission and the reception of the data with the setting processing unit 31 of the CPU 3 in addition to the control signal.

Also, since the computation unit 84 is included, the target data of the reduction computation is input to the reduction computation apparatus 8 from an external location, and also the result of the reduction computation is output to the external location. To be more specific, the reception apparatus 81 extracts computation target data from the received data from the two or more synchronization apparatuses and inputs the computation target data to the computation unit 84. The computation unit 84 performs the computation on the extracted computation target data and outputs the computation result data to the transmission apparatus 83. The transmission apparatus 83 adds the computation result data to the data to the two or more synchronization apparatuses that perform the synchronization to be respectively transmitted.

First target data of the reduction computation is input from the setting processing unit 31 of the CPU 3 to the input data register 841 as the write data and input from the input data register 841 to the computation unit 84. Second target data of the reduction computation is input from the network 2 via the reception apparatus 81 as the packet, and the second target data is taken out from the packet to be input to the computation unit 84.

On the other hand, the result of the reduction computation is output from the computation unit 84 to the output data register 842 and output from the output data register 842 to the setting processing unit 31 of the CPU 3 as the read data. Also, the result of the reduction computation is output from the computation unit 84 to the transmission apparatus 83 and transmitted from the transmission apparatus 83 to the network 2 as the packet.

The plurality of input data registers 841 and the plurality of output data registers 842 are provided. Each of the input data registers 841 corresponds to the control register 822. This also applies similarly to the output data register 842.

The input data register 841 to which the write data should be written is specified from the setting processing unit 31 by the write address. The input data register 841 from which the read data should be read is specified from the control unit 821 by the read address. The read address of the input data register 841 corresponds, for example, to the control register 822 instructed by the destination information in the packet received by the reception apparatus 81 and is generated on the basis of the setting information of the specified control register 822. The output data register 842 to which the write data should be written is specified from the control unit 821 by the write address. The write address of the output data register 842 corresponds to the control register 822 used for the reduction computation of the write data and is generated on the basis of the setting information of the specified control register 822. The output data register 842 from which the read data should be read is specified from the setting processing unit 31 by the read address.

To execute the reduction computation, while following the setting condition input from the IO apparatus 11, the setting processing unit 31 sets a transmission destination of the first barrier synchronization message and a transmission destination of the second barrier synchronization message in the reduction computation apparatus 8 in the reduction computation apparatus 8.

Also, the setting processing unit 31 transmits the data of the computation target to the reduction computation apparatus 8 via the system control unit 5 at the start of the reduction computation and also receives the reduction computation result from the reduction computation apparatus 8. The reduction computation apparatus 8 performs the communication with the reduction computation apparatus of the other node 1 via the network 2 and performs the reduction computation on the basis of the relevant communication.

Furthermore, to execute the reduction computation, after the synchronization establishment, the synchronization unit 82 included in the reduction computation apparatus 8 instructs the transmission apparatus 83 to perform the transmission of the second barrier synchronization message (in the drawing, "synchronization message transmission instruction addressed to other node") and also instructs the computation unit 84 to perform the previously decided reduction computation. Also, in a case where the instruction of the second barrier synchronization message transmission is received, the transmission apparatus 83 transmits the result of the reduction computation in the computation unit 84 to the network 2 together with the second barrier synchronization message.

Also, the control unit 821 of the synchronization unit 82 holds computation type information. The computation type information is information indicating a type of a computation for the control on the reduction computation in the computation unit 84. The computation type information is input from the CPU 3 to the control unit 821 via the input data register. The computation type information is also input from the IO apparatus 11 as a part of the setting condition.

The reduction computation in the example of FIG. 10 is carried out as follows.

Similarly as in the barrier synchronization apparatus 6, the setting processing unit 31 sets the setting information in the control register 822 corresponding to the respective sets of the reduction computations in the synchronization unit 82 on the basis of the setting condition. The setting processing unit 31 inputs the input data to the input data register 841 and transmits the reduction synchronization start signal to the synchronization unit 82. According to this, the reduction computation by the computation unit 84 is started. In a case where the synchronization is established in the control register 822 corresponding to the last stage, the reduction computation apparatus 8 sends the computation result and the signal of the reduction computation completion to the setting processing unit 31.

The reception apparatus 81 receives the packet via the network 2 and transmits the synchronization signal and the destination information to the synchronization unit 82 on the basis of the received packet. The reception apparatus 81 transmits the data received as the packet to the computation unit 84.

In the computation unit 84, the input data register 841 temporarily stores the input data that is the target of the reduction computation transmitted from the CPU 3 and inputs the stored data in the computation unit 84 in accordance with the instruction from the control unit 821. The data from the CPU 3 is input at the start of the reduction computation as described above.

In a case where the synchronization is established, while following the computation instruction from the control unit 821, the computation unit 84 performs a specified reduction computation on first data and second data. The first data is, for example, the data of its own node 1, in other words, the computation result carried out in the previous stage by the computation unit 84. The second data is, for example, the data received from the other node 1, in other words, the data from the packet received by the reception apparatus 81. The type of the computation is instructed by a computation apparatus control from the control unit 821.

While following the control from the control unit 821, the computation unit 84 holds the computation result and also inputs the computation result to the transmission apparatus 83. To be more specific, before the reduction computation is completed, the computation result is output to the transmission apparatus 83, and in cases other than this, the computation result is set to be output to the output data register 842.

The output data register 842 outputs the result of the reduction computation to the CPU 3. The reduction computation result output from the output data register 842 is input to the CPU 3 at the time of the reduction computation completion.

In a case where the computation result is received from the computation unit 84 and the transmission instruction is received from the control unit 821, on the basis of these, the transmission apparatus 83 generates a packet and transmits the generated packet to the network 2.

Similarly as in the synchronization unit 62 of the barrier synchronization apparatus 6, the synchronization unit 82 performs a processing of changing a transmission destination of an intermediate result of the computation for each of the stages. In a case where the synchronization signal and the setting information are received from the reception apparatus 81, the control unit 821 of the synchronization unit 82 sends the synchronization signal to the control register 822 corresponding to the received setting information.

In a case where the synchronization is established, the control unit 821 outputs the synchronization signal, in other words, the transmission instruction of the message on the barrier synchronization addressed to the other node 1 to the transmission apparatus 83. At this time, the control unit 821 controls the computation unit 84 in addition to the transmission of the synchronization signal to the specified control register 822 in the synchronization unit 82 of its own process or its own node 1. For example, the control unit 821 performs the reduction computation between the data input to the computation unit 84 and the held computation result in the previous stage. On the other hand, in a case where the synchronization is not established, the control unit 821 causes the computation unit 84 to hold the data.

In a case where the synchronization signal is transmitted to the specified control register 822 of the synchronization unit 82 of its own process or its own node 1, when the synchronization is established, the control unit 821 further controls the computation unit 84 so that the computation on the computation result and the data waited for in the storage unit in the computation unit 84. On the other hand, in a case where the synchronization is not established, the control unit 821 transmits the computation result to the storage unit in the computation unit 84.

When the signal of the reduction computation start is received from the setting processing unit 31, the control unit 821 transmits the synchronization signal and the data input from the setting processing unit 31 to the specified set, in this instance, the transmission destination of the control register 822. In a case where the synchronization is established in the last set, the control unit 821 transmits the computation result and the signal of the reduction computation completion to the setting processing unit 31.

Figure 12:
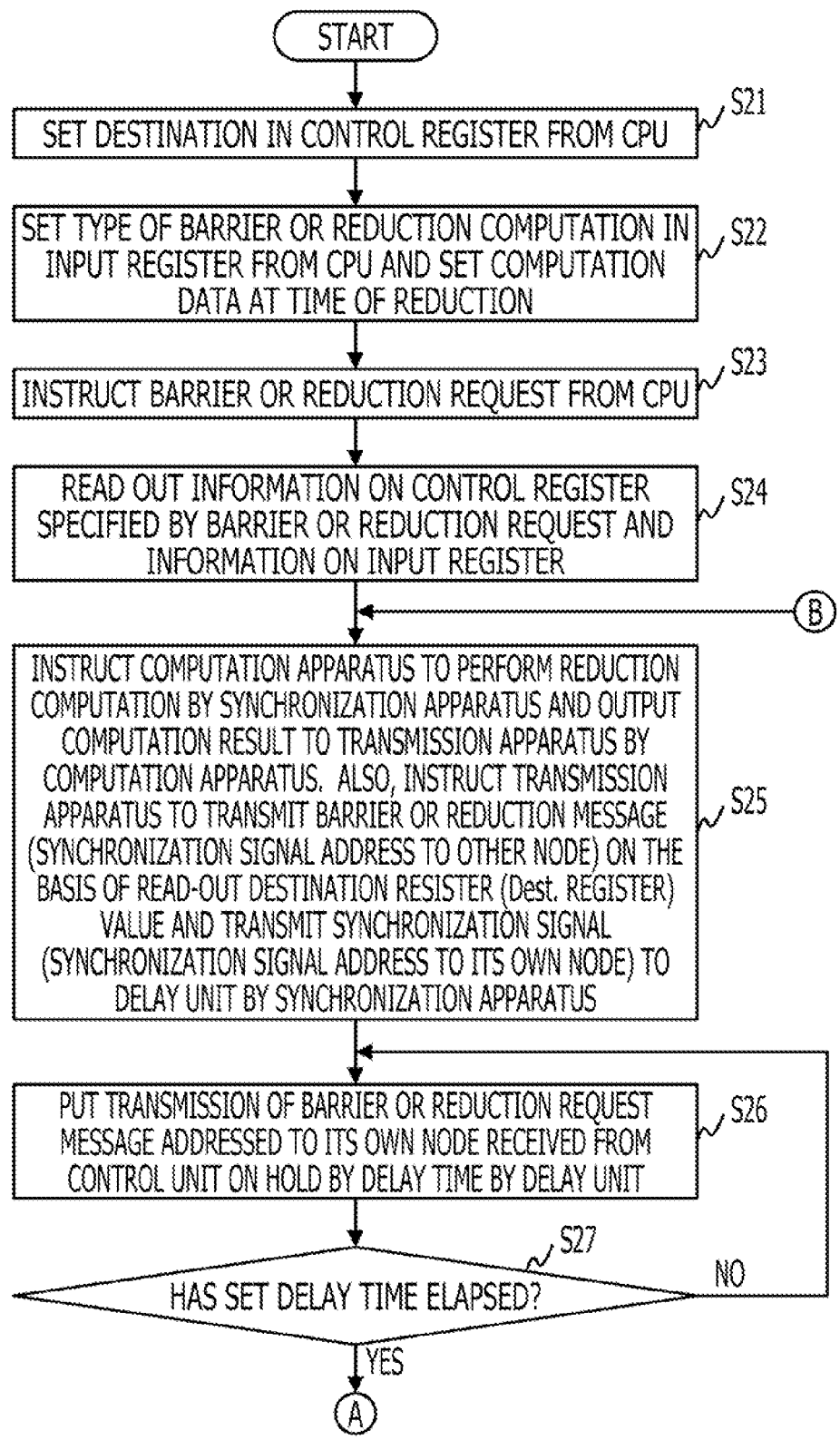
FIG. 12 is a processing flow chart at the time of a reduction computation execution.
Figure 13:
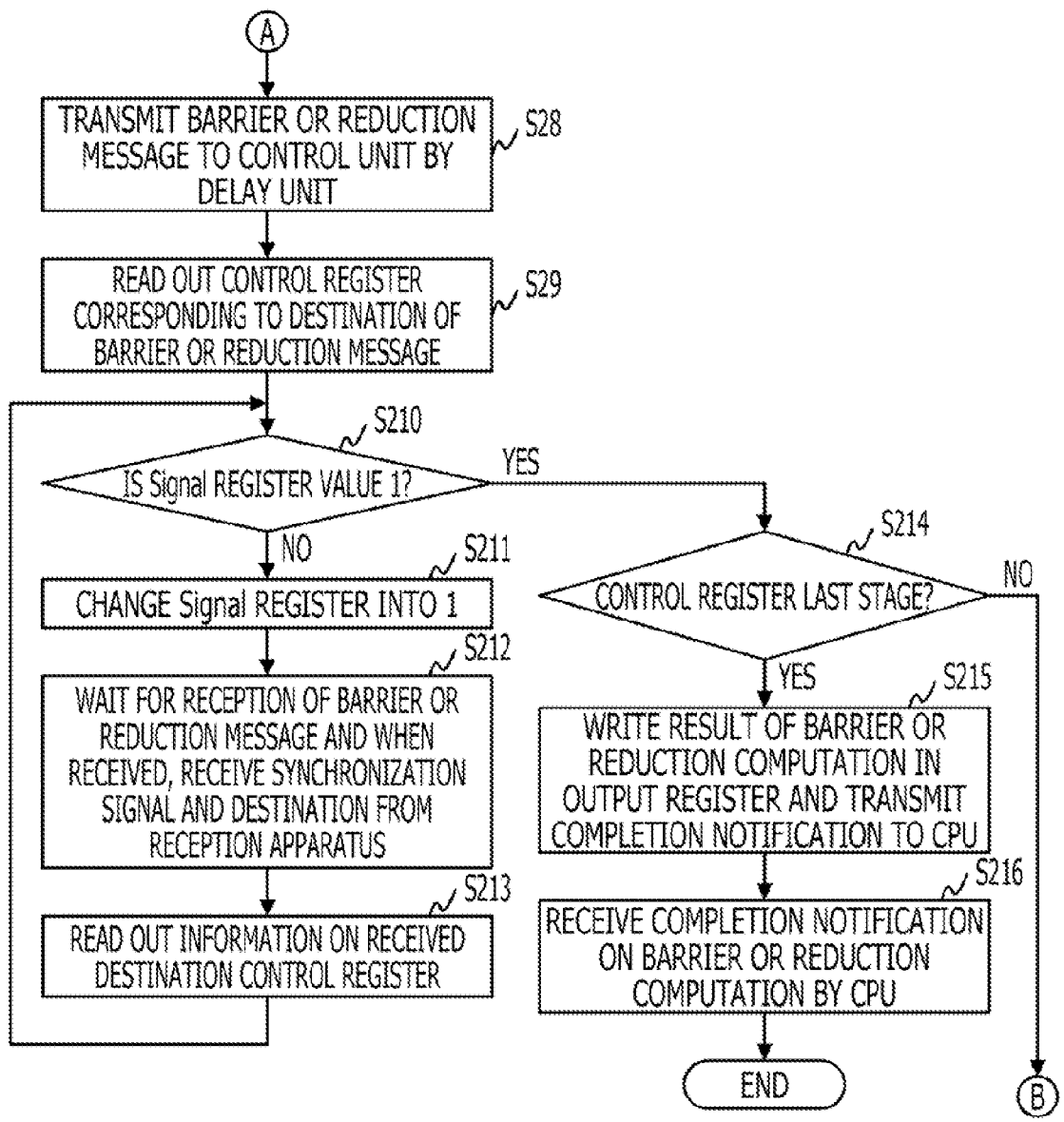
FIG. 13 is a processing flow chart at the time of the reduction computation execution.

FIG. 12 and FIG. 13 illustrate a processing flow of the processing for carrying out the reduction computation while the barrier synchronization based on the butterfly is carried out which is executed by the reduction computation apparatus 8 of FIG. 10 in an integrated manner.

This reduction computation utilizes the barrier synchronization. Therefore, the processing flow of FIG. 13 is substantially the same as the processing flow of FIG. 8 except for the transmission and the reception of the data of the reduction computation target and the inclusion of the reduction computation.

Before the reduction computation is started, the setting processing unit 31 decides the number of the control registers 822 to be used from the number of nodes that perform the reduction computation and sets the destination node address and the destination stage number corresponding to the next stage in the butterfly in destination registers 8222 of the respective control registers 822, and also, the setting processing unit 31 sets a computation type in specified registers of the respective control registers 822 (operation S21). The setting of the registers is similarly carried out as in the setting of the registers in the barrier synchronization.

To start the reduction computation, the setting processing unit 31 sets a type of the reduction computation in the input data register 841 and sets the computation data in the input data register 841 (operation S22).

In a case where the process arrives at the barrier point, the setting processing unit 31 sends the barrier synchronization and the signal of the reduction computation start to the synchronization unit 82 of the reduction computation apparatus 8 (operation S23). The barrier synchronization and reduction computation start signal includes the input register number and the destination stage number corresponding to the first stage.

When the barrier synchronization and the signal of the reduction computation start are transmitted, the control unit 821 of the synchronization unit 82 reads the value of the destination registers 8222 of the control register 822 specified by the reduction computation signal (operation S24).

Furthermore, the control unit 821 of the synchronization unit 82 instructs the computation unit 84 to perform the reduction computation. In accordance with this, the computation unit 84 executes the reduction computation and outputs the computation result to the transmission apparatus 83. Also, on the basis of the value for specifying the control register 822 of the other node 1 among the values of the destination registers 8222, the control unit 821 outputs the signal of the packet transmission instruction to the transmission apparatus 83 and also transmits the synchronization signal to a delay unit 824 on the basis of the value for specifying the control register 822 of its own node 1 among the values of the destination registers 8222 (operation S25). The packet transmission instruction includes the value of the destination registers 8222 for specifying the other node 1.

The transmission apparatus 83 generates a packet on the basis of the destination node address and the destination stage number specified by the packet transmission instruction from the control unit 821 and transmits the packet to the network 2. This packet is a barrier synchronization message including the message of the barrier synchronization and the reduction computation addressed to the other node 1, in other words, the synchronization signal. The packet transmission destination of this packet is the specified destination node address and the specified destination stage number. On the other hand, the synchronization signal transmitted by the control unit 821 to the delay unit 824 is a message the barrier synchronization and the reduction computation addressed to its own node 1. For example, the synchronization signal transmitted by the control unit 821 to the delay unit 824 is obtained by removing the header CRC, the routing header, and the packet CRC from the packet of FIG. 5.

The delay unit 824 puts the transmission of the synchronization signal received from the control unit 821 on hold for the period of time equivalent to the delay value which is received from the control unit 821 (operation S26), and it is determined whether or not the period of time equivalent to the delay value, in other words, the delay time has elapsed (operation S27). In a case where the delay time has not elapsed (operation S27: No), the delay unit 824 repeats operation S26. In a case where the delay time has elapsed (operation S27: Yes), the delay unit 824 transmits the held synchronization signal to the control unit 821 (operation S28).

The control unit 821 reads a value of a signal register 8221 of the control register 822 specified in the destination registers 8222 on the basis of the value for specifying the control register 822 of its own node among the values of the destination registers 8222 (operation S29). The control unit 821 checks whether or not "1" is set in the signal register 8221 (operation S210). In a case where "1" is set in the signal register 8221 (operation S210: Yes), the synchronization is established. On the other hand, in a case where "1" is not set in the signal register 8221 (operation S210: No), the synchronization is not established.

In a case where the synchronization is not established, the control unit 821 sets "1" in the signal register 8221 (operation S211) and stores the data at an address corresponding to the control register 822 in the storage apparatus of the computation unit 84. The data is a value of the input data register in a case where the control register 822 is the first stage and is a computation result in the previous stage in a case where the control register 822 is the subsequent stage.

The control unit 821 waits for the reception of the packet from the other process, and in a case where the packet is received from the other process, on the basis of the received packet, the reception apparatus 81 takes out the data, the synchronization signal, and the destination stage number that becomes the destination and transmits the corresponding information to the computation unit 84 and the synchronization unit 82 (operation S212).

In a case where the synchronization signal and the destination stage number are received from the reception apparatus 81, the synchronization unit 82 reads the value Signal of the specified control register 822 (operation S213). After this, operation S210 is repeated.

On the other hand, in a case where the synchronization is established in operation S210 (operation S210: Yes), the control unit 821 checks whether or not the control register 822 corresponds to the last stage (operation S214).

In a case where the synchronization is established in the control register 822 corresponding to the last stage (operation S214: Yes), the control unit 821 stores the computation result in the output data register 842 and transmits the signal of the reduction computation completion to the setting processing unit 31 (operation S215). The setting processing unit 31 receives the signal of the reduction computation completion from the control unit 821 and reads the computation result from the output data register 842 (operation S216).

In a case where the control register 822 does not correspond to the last stage in operation S214 (operation S214: No), the control unit 821 repeats operation S25.

As described above, the reduction computation apparatus 8 of FIG. 10 executes the reduction computation while the barrier synchronization is executed similarly as in the barrier synchronization apparatus 6 of FIG. 2. Therefore, according to the reduction computation apparatus 8 of FIG. 10, similarly as in the flow of the synchronization message between the respective stages in the barrier synchronization processing based on the butterfly of FIG. 9, the synchronization message illustrated and the computation intermediary data of the reduction computation in FIGS. 18A and 18B are transmitted and received. In other words, the transmission and the reception of the synchronization message and the computation intermediary data in its own node 1 are executed via the delay unit 624 where the delay equivalent to the network 2 is generated, and the transmission and the reception of the synchronization message and the computation intermediary data with the other node 1 are executed via the network 2. According to this, in each the stage #2 of the node #0 to the node #3, the synchronization is established at substantially the same time. As a result, in the barrier synchronization, the fluctuation in the establishment of the synchronization between the plurality of nodes can be virtually eliminated.

Figure 14:
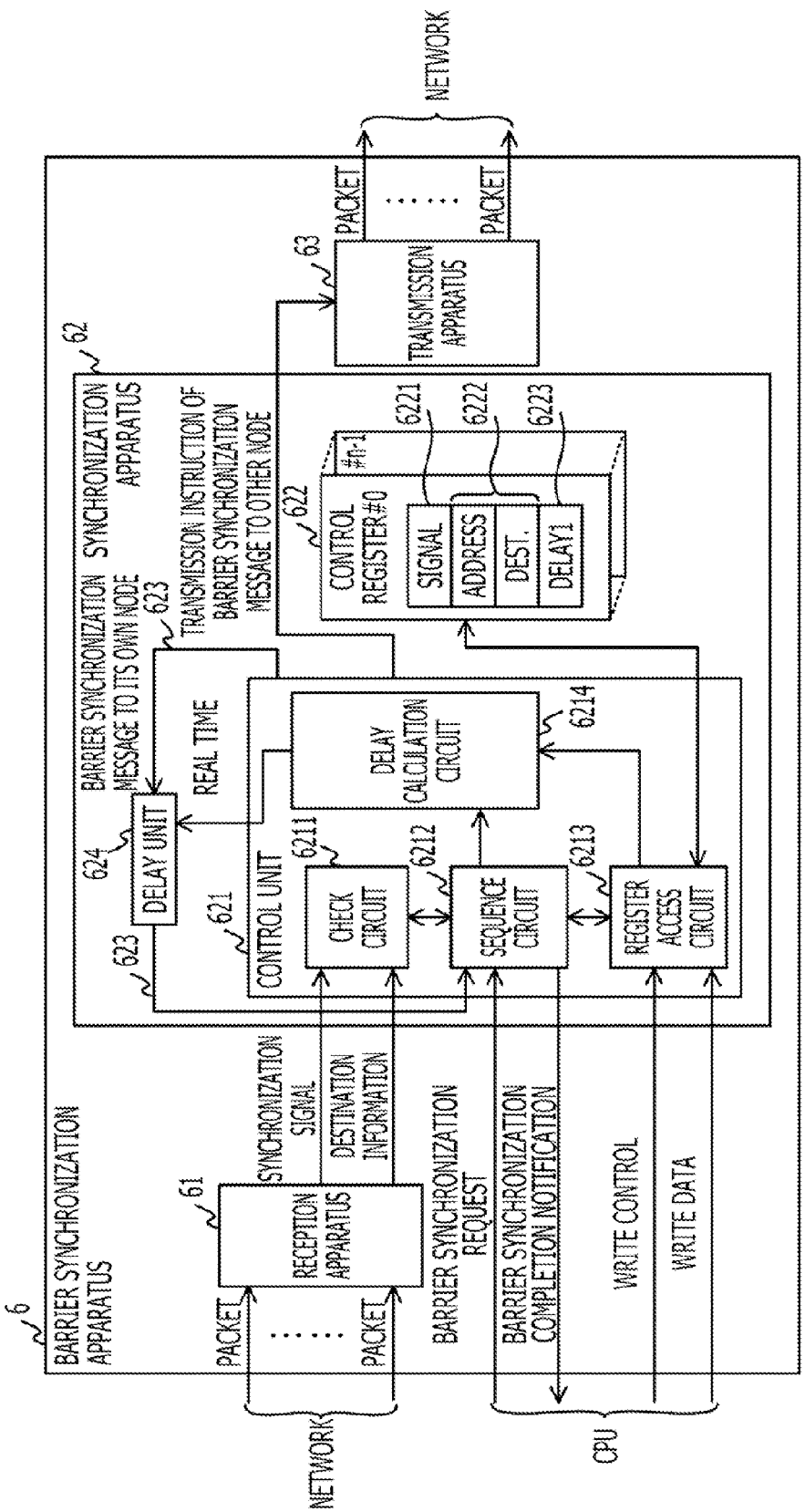
FIG. 14 illustrates another example of the configuration of the node including the barrier synchronization apparatus.

FIG. 14 illustrates another example of the configuration of the node including the barrier synchronization apparatus.

The example of FIG. 14 is an example in which a value functioning as a reference in a case where the delay calculation circuit 6214 calculates a delay value is stored in the control register 622. To be more specific, as illustrated in FIG. 14, in each of the plurality of control registers 622, a delay time register 6223 is provided together with the signal register 6221 and the destination register 6222. In FIG. 14, the delay time register 6223 is represented while a reference symbol Delay1 is assigned.

The delay time register 6223 stores the value functioning as the reference for the calculation of the delay value. The value functioning as the reference for the calculation of the delay value is, for example, a communication delay time on the network 2 or a correction coefficient thereof. For example, even when the distance between the nodes 1 at the logical network address is "1 hop", the communication delay time in the actual communication may largely vary in some cases. In this case, the communication delay time Td per hop can be changed or corrected into an appropriately value by using the reference value stored in the delay time register 6223.

According to this, in a case where the communication time between the respective nodes 1 largely varies while depending on the state of the network 2, with regard to each of the plurality of processes, the delay value is corrected for each process, and the delay processing suitable for each process can be realized. As a result, the fluctuation in the establishment of the synchronization between the plurality of nodes can be virtually eliminated.

Figure 15:
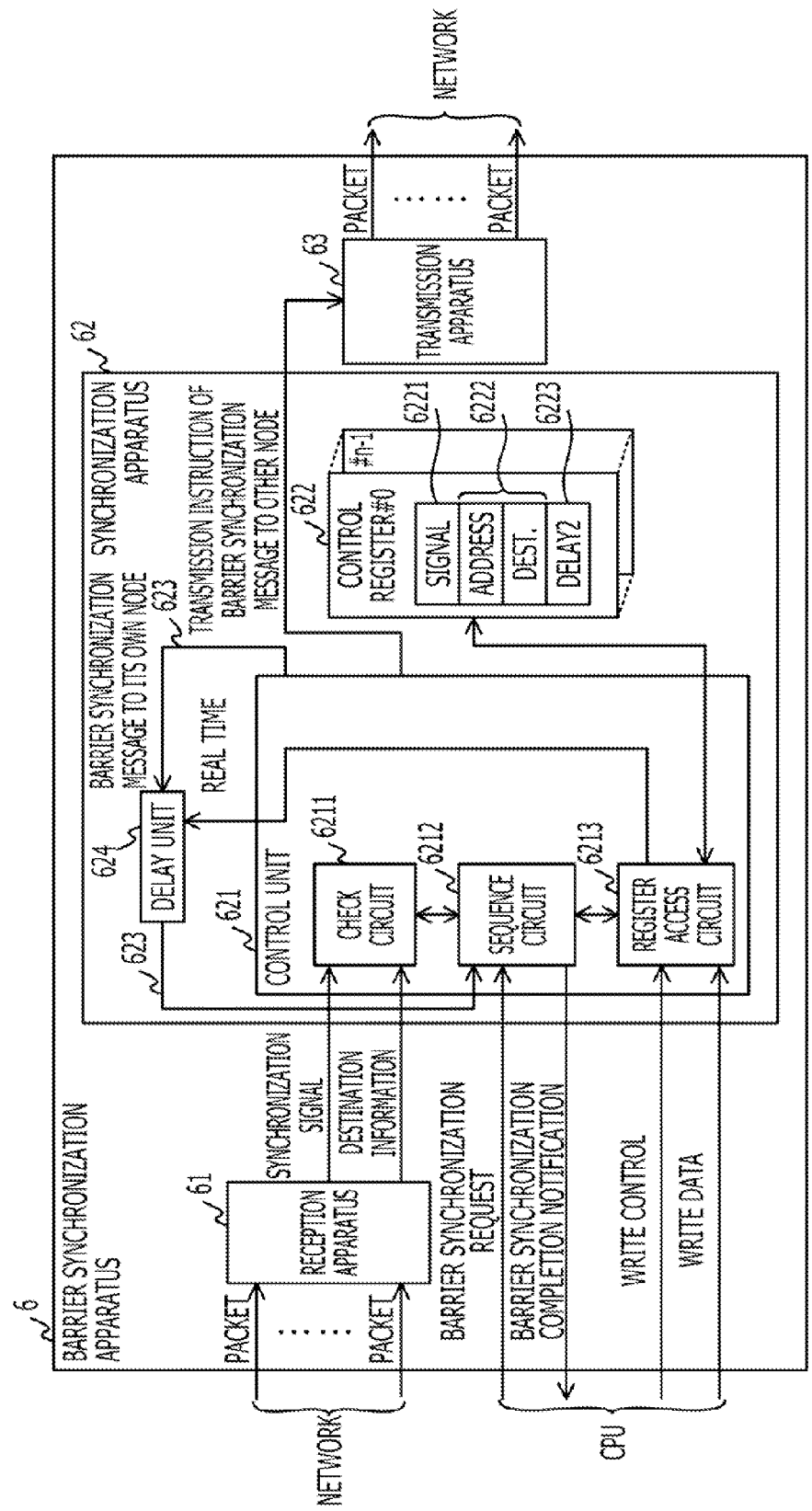
FIG. 15 illustrates still another example of the configuration of the node including the barrier synchronization apparatus.

FIG. 15 illustrates still another example of the configuration of the node including the barrier synchronization apparatus.

The example of FIG. 15 is an example in which the delay calculation circuit 6214 is omitted, and the delay value is stored in the control register 622. To be more specific, as illustrated in FIG. 15, in each of the plurality of control registers 622, a delay value register 6223 is provided together with the signal register 6221 and the destination register 6222. In FIG. 15, the delay value register 6223 is represented while a reference symbol Delay2 is assigned.

The delay value register 6223 stores the delay value. For example, depending on the network 2, the communication delay time in the actual communication can be previously found out. In this case, the previously found out communication delay time Td can be stored in the delay value register 6223 as the delay value.

According to this, in a case where the communication time between the respective nodes 1 can be previously found out while depending on the network 2, with regard to each of the plurality of processes, the delay value is previously set for each process, and the delay processing suitable for each process can be realized. As a result, the fluctuation in the establishment of the synchronization between the plurality of nodes can be virtually eliminated.

In the parallel computer system described above, the algorithm of the barrier synchronization depends on the algorithm based on the butterfly computation, but the barrier synchronization in the parallel computer system is not limited to the barrier synchronization based on the butterfly.

For example, the algorithm of the barrier synchronization may also be dissemination. According to this, even in a case where the number of processes is not a power of 2, in the parallel computer system, the barrier synchronization processing based on the dissemination can be executed, and also, the reduction computation processing by the barrier synchronization based on the dissemination can be executed.

Also, for example, the algorithm of the barrier synchronization may be pairwise exchange with recursive doubling. According to this, even in a case where the number of processes is not a power of 2, in the parallel computer system, the barrier synchronization processing based on the pairwise exchange with recursive doubling can be executed, and also, the reduction computation processing can be executed by the barrier synchronization based on the pairwise exchange with recursive doubling.

Also, in the parallel computer system described above, the barrier synchronization apparatus is provided to each of the nodes, in other words, the processor, but the configuration is not limited to this.

For example, in the parallel computer system formed by a multiprocessor (multiprocessor core), the barrier synchronization apparatus is not provided to each of the nodes, in other words, the processor core, but may be provided independently from the processor core. In other words, one barrier synchronization apparatus may be commonly provided to the plurality of processor cores. Also, in the parallel computer system formed by the multiprocessor core, the reduction computation apparatus is not provided to each of the nodes, in other words, the processor core, but may be provided independently from the processor core. In other words, one reduction computation apparatus may be commonly provided to the plurality of processor cores.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A parallel computer system comprising a plurality of nodes, each of the plurality of nodes being provided with a respective one of a plurality of synchronization apparatuses that establishes synchronization by awaiting incoming data and transmitting the incoming data when all of the incoming data is received, each of the plurality of synchronization apparatuses comprising:
    a receiving unit that receives data from one of the synchronization apparatuses of an other node and extracts synchronization information from the received data;
    a transmitting unit that transmits the data to the synchronization apparatus of the other node;
    a receiving state register that stores the extracted synchronization information;
    a delay unit that delays the received data by a specified period of time; and
    a control unit that stores the extracted synchronization information from the receiving state register and internal synchronization information from the synchronization apparatus in the node, the control unit causing the transmitting unit to transmit the data to the other node and to return the data to the control unit via the delay unit when the extracted synchronization information and the internal synchronization information are stored in the receiving state register.

2. The parallel computer system according to claim 1, wherein each of the synchronization apparatuses further comprises a loop path in which the data transmitted from the transmitting unit is returned back to the control unit, wherein the delay unit is provided in the loop path, and wherein the control unit provided with each of the plurality of synchronization apparatuses transmits the data via the loop path when the data is transmitted to the corresponding node.

3. The parallel computer system according to claim 1, wherein the specified time is substantially equal to a period of time required by the data transmitted to the other node.

4. The parallel computer system according to claim 1, wherein the receiving unit provided in each of the plurality of synchronization apparatuses extracts computation target data from the received data,
    wherein each of the plurality of synchronization apparatuses further comprises a reduction computation unit that computes the extracted computation target data and outputs the computed data, and
    wherein the transmitting unit provided in each of the plurality of synchronization apparatuses transmits data including the computed data to the synchronization apparatus of the other node.

5. The parallel computer system according to claim 1, wherein the control unit provided in each of the plurality of synchronization apparatuses causes the transmitting unit to respectively transmit the data to the plurality of synchronization apparatuses that perform synchronization when all of the synchronization information from the plurality of synchronization apparatuses that perform synchronization are stored in the receiving state register.

6. The parallel computer system according to claim 1, wherein the parallel computer system performs synchronization between a first group of the plurality of synchronization apparatuses that perform synchronization with each other and perform synchronization among a second group of the plurality of synchronization apparatuses after the synchronization among the first group of the plurality of synchronization apparatuses is completed.

7. A synchronization apparatus in a parallel computer system comprising a plurality of nodes and synchronization apparatuses, each of the plurality of nodes being provided with one of the plurality of synchronization apparatuses that establishes synchronization by awaiting incoming data and transmitting the data when all of the incoming data is received, the synchronization apparatus comprising:

a receiving unit that receives data from a synchronization apparatus of another node which performs synchronization with its own node from among the plurality of synchronization apparatuses and extracts synchronization information from the received data;

a transmitting unit that transmits the data to the synchronization apparatus of the other node;

a receiving state register that stores the extracted synchronization information;

a delay unit that delays the received data by a specified period of time; and a control unit that stores the extracted synchronization information from the receiving state register and internal synchronization information from the synchronization apparatus in the node, the control unit causing the transmitting unit to transmit the data to the other node and to return the data to the control unit via the delay unit when the extracted synchronization information and the internal synchronization information are stored in the receiving state register.

8. The synchronization apparatus according to claim 7, wherein the synchronization apparatus further comprises a loop path in which the data transmitted from the control unit is returned backed to the control unit, wherein the delay unit is provided in the loop path, and wherein the control unit provided with each of the plurality of synchronization apparatuses transmits the data via the loop path when the data is transmitted to the corresponding node.

9. The synchronization apparatus according to claim 7, wherein the specified time is substantially equal to a period of time required by the data transmitted to the other node.

10. The synchronization apparatus according to claim 7, wherein the receiving unit provided with the synchronization apparatus extracts computation target data from the received data, wherein the synchronization apparatus further comprises a reduction computation unit that computes the extracted computation target data and outputs the computed data, and wherein the transmitting unit provided with the synchronization apparatus transmits data including the computed data to the synchronization apparatus of the other node.

11. The synchronization apparatus according to claim 7, wherein the control unit provided with the synchronization apparatus causes the transmitting units to respectively transmit the data to the plurality of synchronization apparatuses that perform synchronization when all of the synchronization information from the plurality of synchronization apparatuses that perform synchronization are stored in the receiving state register.

12. A control method for a parallel computer system including a plurality of nodes, each of the plurality of nodes being provided with a respective one of a plurality of synchronization apparatuses that establish synchronization by awaiting incoming data and transmitting the incoming data when all of the incoming data is received, the control method comprising:

receiving data from one of the synchronization apparatuses of another node;

extracting synchronization information from the received data;

storing the extracted synchronization information in a receiving state register by a control unit provided in each of the plurality of synchronization apparatuses;

causing a transmission unit provided in each of the synchronization apparatuses to transmit the data to the another node based on the stored synchronization information; and returning the data to the control unit via a delay unit that delays the data by a specified period of time when the extracted synchronization information and the internal synchronization information is stored in the receiving state register.

* * * * *